(12) United States Patent
Wane et al.

(10) Patent No.: US 11,563,725 B2
(45) Date of Patent: *Jan. 24, 2023

(54) USING KEYBOARD APP TO ENCRYPT E-MAIL AND OTHER DIGITAL DATA

(71) Applicants: Brian Wane, Walnut Creek, CA (US); Ikechi Echebiri, Riverside, CA (US); Junaid Islam, San Jose, CA (US)

(72) Inventors: Brian Wane, Walnut Creek, CA (US); Ikechi Echebiri, Riverside, CA (US); Junaid Islam, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,489

(22) Filed: May 10, 2021

(65) Prior Publication Data

US 2021/0352055 A1 Nov. 11, 2021

Related U.S. Application Data

(60) Provisional application No. 63/022,386, filed on May 8, 2020.

(51) Int. Cl.
*H04L 9/40* (2022.01)
*H04L 9/08* (2006.01)
(Continued)

(52) U.S. Cl.
CPC .......... *H04L 63/0435* (2013.01); *H04L 9/083* (2013.01); *H04L 9/0869* (2013.01); *H04L 9/0891* (2013.01); *H04L 51/046* (2013.01); *H04L 51/08* (2013.01); *H04L 63/168* (2013.01); *G06F 8/61* (2013.01); *G06F 9/445* (2013.01)

(58) Field of Classification Search
CPC ..... H04L 9/0852; H04L 9/0869; H04L 9/083; H04L 9/0861; H04L 9/321; H04L 63/062;
(Continued)

(56) References Cited

U.S. PATENT DOCUMENTS

| 8,520,855 B1 * | 8/2013 | Kohno | G06F 21/602 726/8 |
| 11,245,519 B1 * | 2/2022 | Stapleton, Jr. | H04L 9/0858 |

(Continued)

FOREIGN PATENT DOCUMENTS

| EP | 3086587 | 10/2016 |
| KR | 20170053459 | 5/2017 |

(Continued)

OTHER PUBLICATIONS

International Search Report, PCT Application PCT/US2021/031626, dated Jul. 28, 2021, 4 pages.

*Primary Examiner* — Tae K Kim
(74) *Attorney, Agent, or Firm* — Aka Chan LLP

(57) ABSTRACT

A system uses a keyboard application to encrypt and decrypt e-mail, messages, and other digital data. By using quantum random number generators, the system has improved data security. Using a quantum random number, an agent (at a sender side) generates an encryption key which is used to automatically encrypt a message. The encryption key is stored at a key server. The encrypted message will be sent by an application using its standard transmission means such as SMTP, SMS, and others. The encrypted message can be automatically unencrypted by using an agent (at a recipient side) and retrieving the key from the key server. The system also provides an optional double encryption, where the message is encrypted with a user-generated password before being encrypted using the encryption key.

32 Claims, 33 Drawing Sheets

(51) Int. Cl.
*H04L 51/08* (2022.01)
*H04L 51/046* (2022.01)
*G06F 9/445* (2018.01)
*G06F 8/61* (2018.01)

(58) Field of Classification Search
CPC ... H04L 63/067; H04L 63/0435; H04L 63/04; H04L 63/0428; H04L 63/06
See application file for complete search history.

(56) References Cited

U.S. PATENT DOCUMENTS

| | | | |
|---|---|---|---|
| 11,356,252 B1* | 6/2022 | Islam | H04L 9/0863 |
| 2008/0086646 A1* | 4/2008 | Pizano | H04L 9/0819 |
| | | | 713/182 |
| 2011/0296179 A1* | 12/2011 | Templin | H04L 63/061 |
| | | | 713/168 |
| 2016/0360402 A1* | 12/2016 | Park | H04L 63/0428 |
| 2019/0394031 A1* | 12/2019 | Deng | H04L 9/0861 |
| 2021/0160062 A1* | 5/2021 | Sembhi | H04L 67/104 |
| 2022/0173899 A1* | 6/2022 | Low | H04L 9/0869 |

FOREIGN PATENT DOCUMENTS

| | | | | |
|---|---|---|---|---|
| WO | WO2012113198 | | 8/2012 | |
| WO | WO2019088689 | | 5/2019 | |
| WO | WO-2019088689 A1 * | | 5/2019 | ........... H04L 63/029 |

* cited by examiner

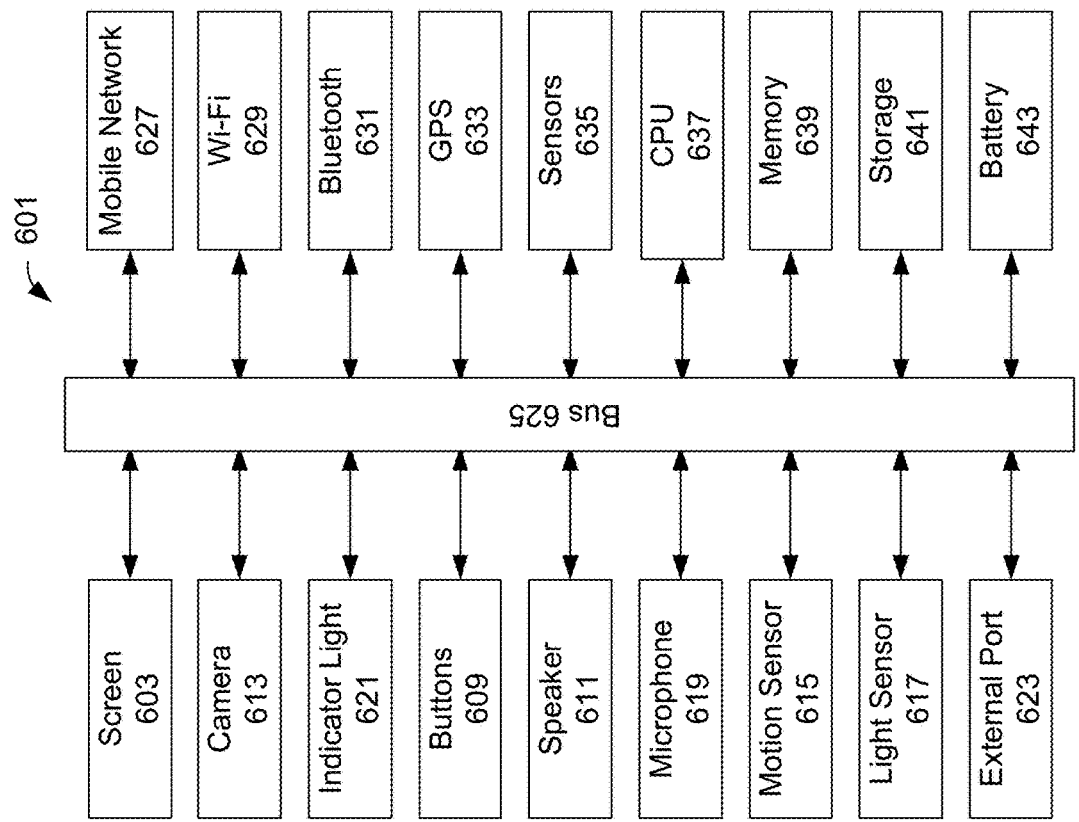
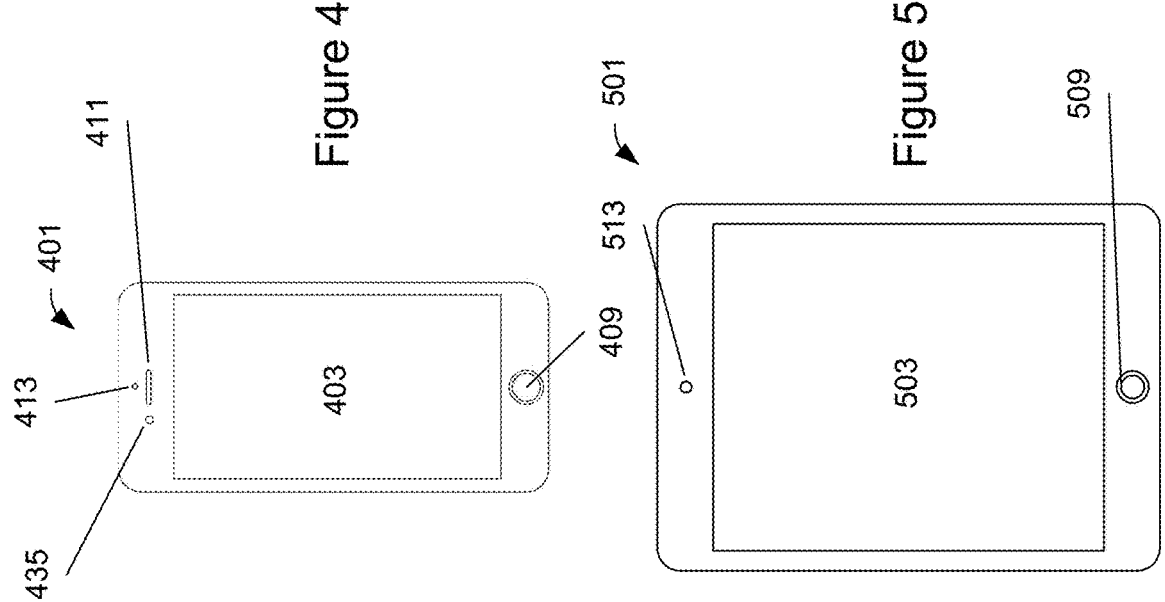

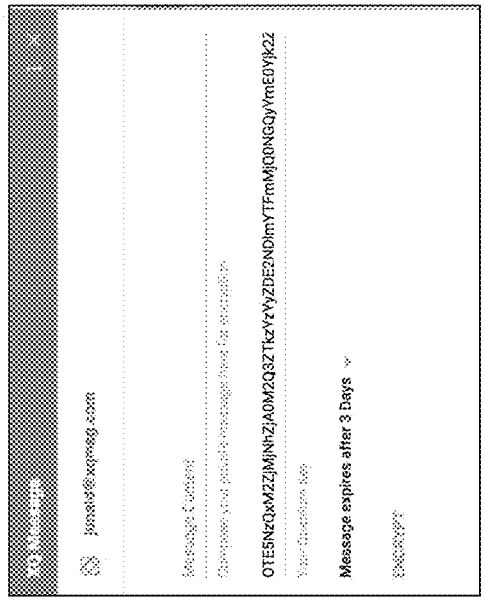
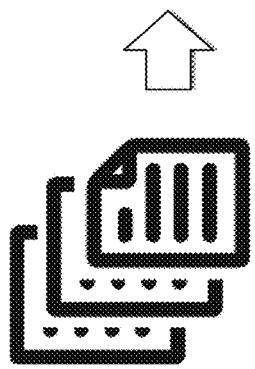
Figure 15

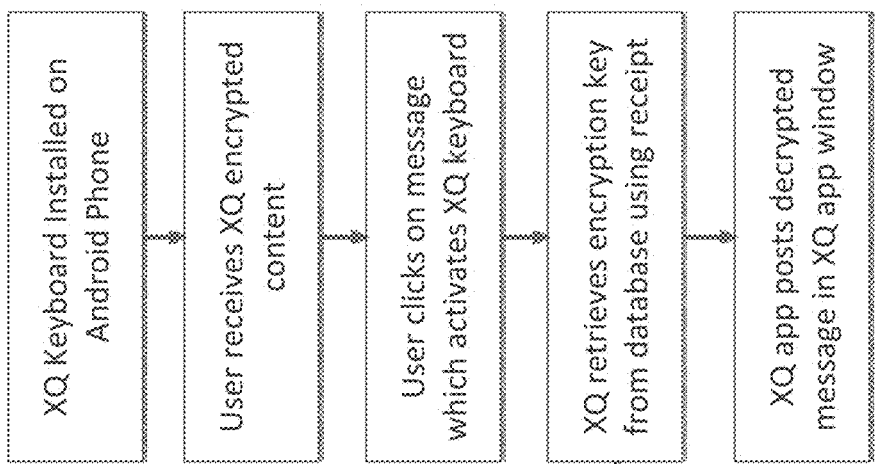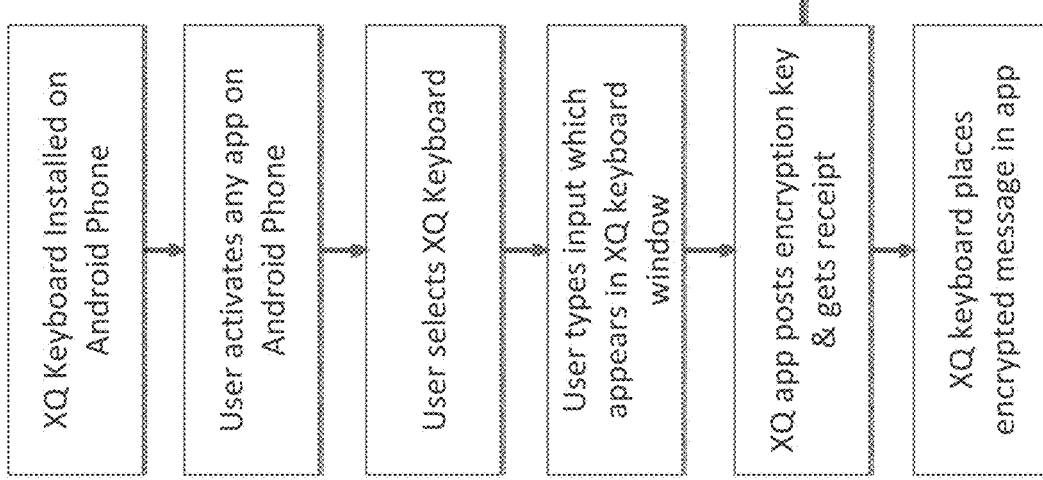
Figure 26 a)

ized to encrypt and decrypt PDF page with double-column layout about a patent.

USING KEYBOARD APP TO ENCRYPT E-MAIL AND OTHER DIGITAL DATA

CROSS-REFERENCE TO RELATED APPLICATIONS

This application claims the benefit of U.S. patent application 63/022,386, filed May 8, 2020, which is incorporated by reference along with U.S. patent application Ser. No. 16/810,821, filed Mar. 5, 2020, and 62/814,209, filed Mar. 5, 2019 and all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

This invention relates to encryption of software and more specifically to encryption and decryption of e-mail, application messaging, and other digital data.

The Internet and Internet communications such as e-mail and text messaging have enjoyed widespread success. However, there are significant concerns about preventing data breaches and ways of securing digital communications.

There is a need for improved approaches to securing digital communications, especially through encryption.

BRIEF SUMMARY OF THE INVENTION

A system uses a keyboard application to encrypt and decrypt e-mail, messages, and other digital data. By using quantum random number generators, the system has improved data security. Using a quantum random number, an agent (at a sender side) generates an encryption key which is used to automatically encrypt a message. The encryption key is stored at a key server. The encrypted message will be sent by an application using its standard transmission means such as SMTP, SMS, and others. The encrypted message can be automatically unencrypted by using an agent (at a recipient side) and retrieving the key from the key server. The system also provides an optional double encryption, where the message is encrypted with a user-generated password before being encrypted using the encryption key.

In an implementation, a method includes: installing a keyboard application on a first device; invoking a first application on the first device; within the first application, invoking the keyboard application; receiving a message input by the user in an input screen of the keyboard application within the first application, without exiting the first application; from the keyboard application, requesting a quantum random number for a quantum random number generator server; using the quantum random number received, within the keyboard application, generating an encryption key; using the keyboard application within the first application, sending a copy of the encryption key to an encryption key server and receiving a transaction receipt identifier from the encryption key server; using the keyboard application within the first application, encrypting the message using the encryption key and inserting the encrypted message in an input section of the first application in a form of a uniform resource locator (URL) link; and using the keyboard application within the first application, adding the transaction receipt identifier in unencrypted form to the body section of a new message screen of the first application. The encrypted message and the transaction receipt identifier in the input section of a new message screen will be transmitted by the first application.

In an implementation, a method includes: installing an keyboard application on a first mobile device; invoking a first messaging application on the first mobile device; within the first messaging application, invoking the keyboard application to input keyboard information; upon receiving an encryption request, via the keyboard application, requesting quantum random number for a quantum random number generator server; using the quantum random number received, within the first messaging application, generating an encryption key; using the encryption helper application within the first messaging application, sending a copy of the encryption key and receiving a transaction receipt identifier from the encryption key server; receiving a message input by the user in the keyboard application within the messaging application, without exiting the first messaging application; using the keyboard application within the first messaging application, encrypting the message using the encryption key; and using the keyboard application, inputting the encrypted message along the transaction receipt identifier to the first messaging application for transmission by the first messaging application.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-5 show examples of mobile devices, which can be mobile clients.

FIG. 6 shows a system block diagram of mobile device.

FIG. 15 shows an example where the system can be used to send documents or attachments.

FIG. 26 shows a flow of a technique of using a keyboard application that encrypts e-mail or other digital data.

DETAILED DESCRIPTION OF THE INVENTION

Figure 1:
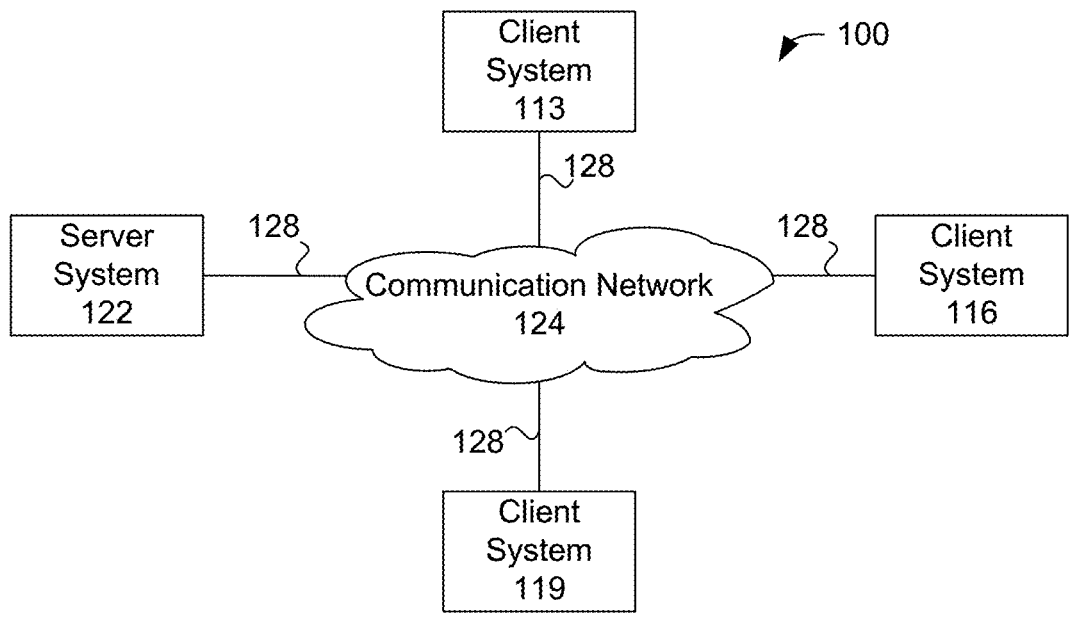
FIG. 1 shows a simplified block diagram of a client-server system and network.

FIG. 1 is a simplified block diagram of a distributed computer network 100. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
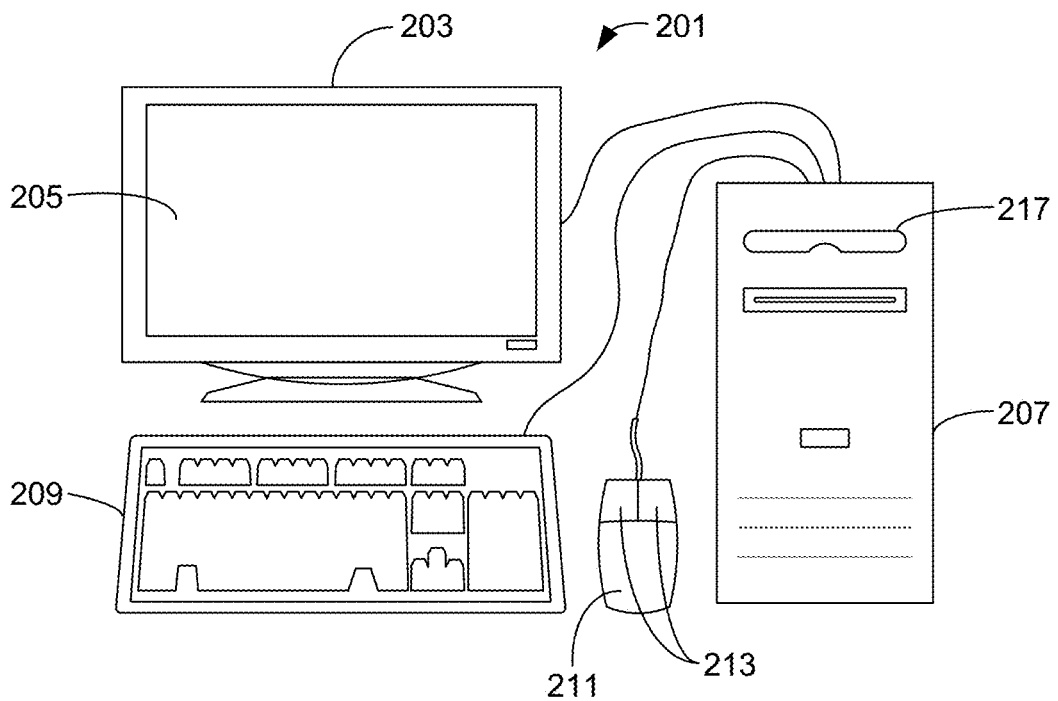
FIG. 2 shows a more detailed diagram of a client or server computer.

FIG. 2 shows an example of a client or server system. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 11), Apple iPad (e.g., Apple iPad or Apple iPad mini), Apple iPod (e.g, Apple iPod Touch), Samsung Galaxy product (e.g., Galaxy S series product or Galaxy Note series product), Google Nexus or Pixel devices (e.g., Nexus 6, Nexus 7, Nexus 9, of Pixel 4), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
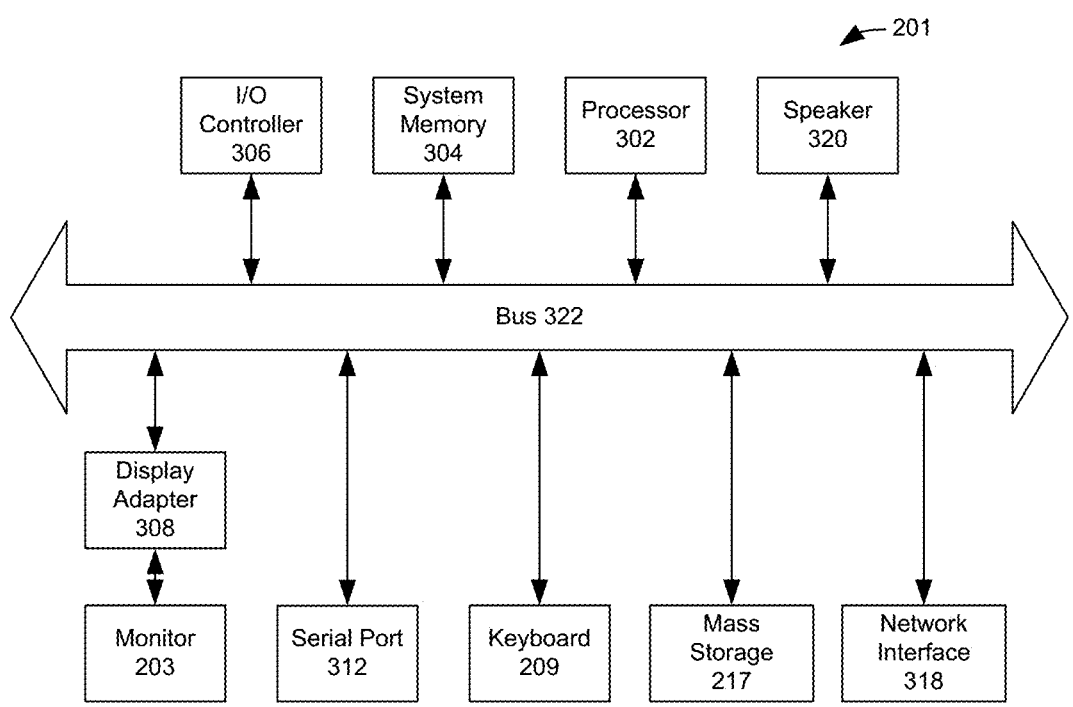
FIG. 3 shows a system block diagram of a client or system computer system.

FIG. 3 shows a system block diagram of computer system 201. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C #, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

FIGS. 4-5 show examples of mobile devices, which can be mobile clients. Mobile devices are specific implementations of a computer, such as described above. FIG. 4 shows a smartphone device 401, and FIG. 5 shows a tablet device 501. Some examples of smartphones include the Apple iPhone, Samsung Galaxy, and Google Nexus family of devices. Some examples of tablet devices include the Apple iPad, Samsung Galaxy Tab, and Google Nexus family of devices.

Smartphone 401 has an enclosure that includes a screen 403, button 409, speaker 411, camera 413, and proximity sensor 435. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 409 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 501 is similar to a smartphone. Tablet 501 has an enclosure that includes a screen 503, button 509, and camera 513. Typically the screen (e.g., touch screen) of a tablet is larger than a smartphone, usually 7, 8, 9, 10, 12, 13, or more inches (measured diagonally).

FIG. 6 shows a system block diagram of mobile device 601 used to execute the software of the present invention. This block diagram is representative of the components of smartphone or tablet device. The mobile device system includes a screen 603 (e.g., touch screen), buttons 609, speaker 611, camera 613, motion sensor 615, light sensor 617, microphone 619, indicator light 621, and external port 623 (e.g., USB port or Apple Lightning port). These components can communicate with each other via a bus 625.

The system includes wireless components such as a mobile network connection 627 (e.g., mobile telephone or mobile data), Wi-Fi 629, Bluetooth 631, GPS 633 (e.g., detect GPS positioning), other sensors 635 such as a proximity sensor, CPU 637, RAM memory 639, storage 641 (e.g., nonvolatile memory), and battery 643 (e.g., lithium ion or lithium polymer cell). The battery supplies power to the electronic components and is rechargeable, which allows the system to be mobile.

Figure 7:
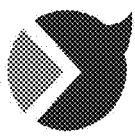
FIG. 7 shows an overview of a messaging, e-mail, and texting system.

FIG. 7 shows an overview of a messaging, e-mail, and texting system. The systems can be standalone, such as secure messaging by itself, e-mail by itself, or texting (e.g., SMS or MMS) by itself, or a combination. The system creates the world's most secure messaging, e-mail, and texting encryption scheme. A description of a secure e-mail system is presented below. This description also applies to other types of communication transmitted via a network, including messaging, application messaging, texting (e.g., SMS or MMS), instant messaging, Apple iMessage, and many others. Generally, text messaging involves sending electronic messages, typically composed of alphabetic and numeric characters (and sometimes emojis), between two or more users of mobile devices (e.g., phones, smartphones, and tablets), desktops or laptops, or other type of computing devices.

One of the problems with messaging, e-mail, and texting is that name, password protection is open to attack. For example, foreign countries have infiltrated messaging, e-mail, and texting services as we saw during the 2016 election and a private e-mail server of a high ranking government official. And also quantum computers can break digital certificates.

Figure 8:
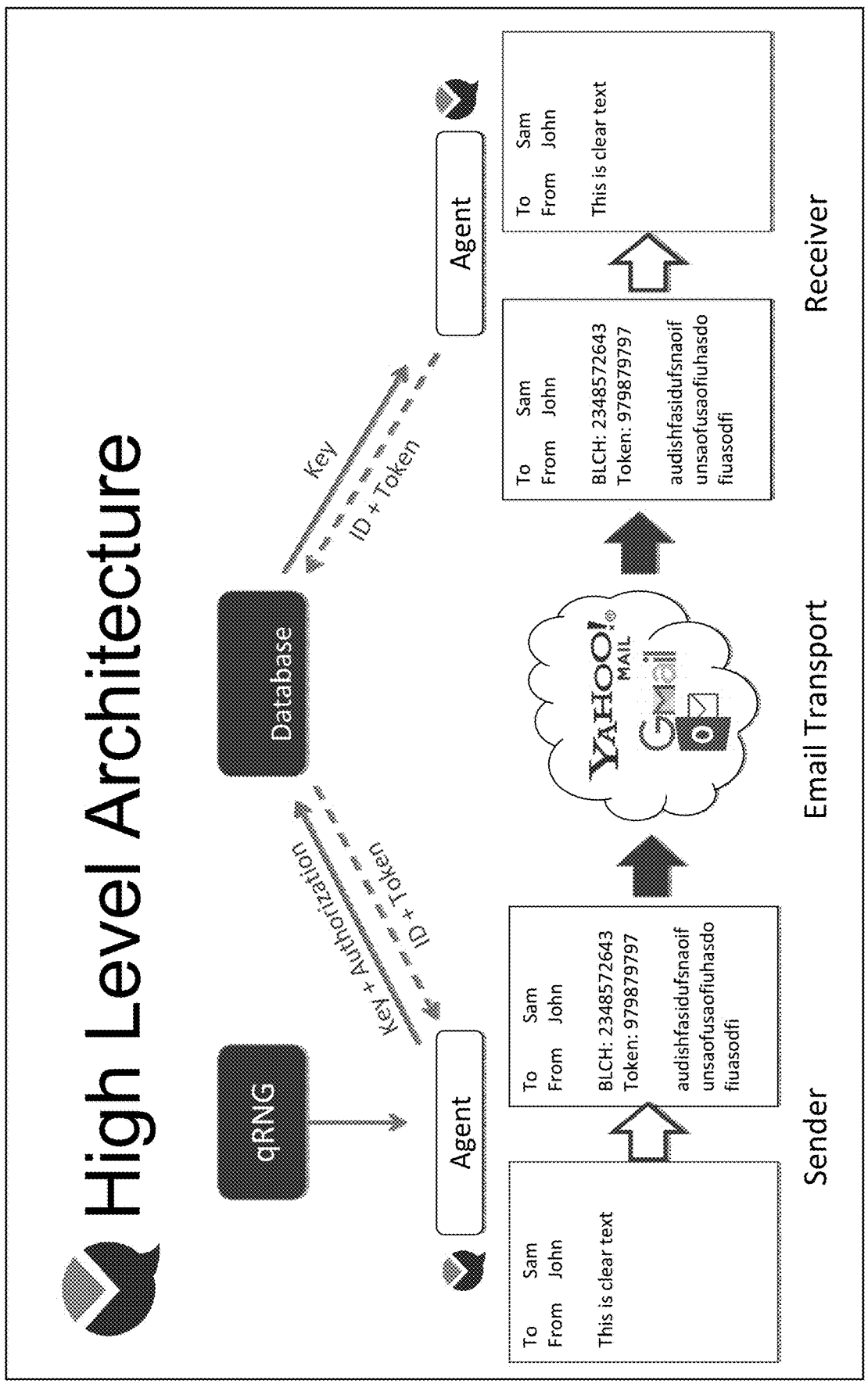
FIG. 8 shows a high-level architecture of a system.

For a secure e-mail system, there is no name and password for the encryption. A specific implementation is known as XQ Messaging by XQ Message. FIG. 8 shows a high-level architecture of the system. The data is only available to the sender and receiver. So even though the system (e.g., server) handles the encryption. The server does not know where the data is so the data stays with the only the people on the e-mail system.

The system uses a quantum random number generator (qRNG) to create the encryption key. The qRNG is basically creating the equivalent of digital noise, and the system uses that noise to make sure that every encryption key is different. Our solution works with any e-mail system. The system has premium features like user password and auditing archive. So for example, law firms or doctors desire an auditing feature, such as for HIPAA regulations.

In FIG. 8, there are software agents, which can be, for example, in the browser, in a mobile phone, or a Google Web mail (or Gmail) add on, or any combination of these. These agents are at the edge device. The agents are able to get the quantum number directly from the system's servers. And then the agents use the quantum number to encrypt a message. And then what they do is they publish that encryption key, along with authorization policies.

So an example of an authorization policy is who the receiver is, so only that receiver can get open the message and decrypt it. Another authorization policy is time, like the authorization or key is only good for three days, five days, or other selected number of days. Another authorization policy is a one-time password or a message password, which basically takes the encrypted content and encrypts that content yet another time.

When a message password is enabled, the message is double encrypted. This e-mail approach is extra secure because that extra encryption is not known to the system. So the system does not have back doors, where for example, a hacker could break into the system and the database, and determine the encryption keys. However, nowhere does the system store where the messages are. In fact, that information is not even tracked by the system. Further, when the one-time password is used, the system encrypts using information not stored in the system at all. The password is known only between the sending and receiving party. So, the system does not even know if an extra encryption was used.

Figure 9:
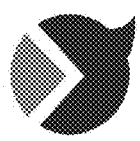
FIG. 9 describes some of the security features of the system.

FIG. 9 describes some of the security features of the system. A new quantum number is used to generate an encryption key for every message, which makes brute force attacks practically impossible because of the very large number of random numbers. The Q, the quantum number is used to generate an AES key, which has been published to the database, and then, that one-time message password adds extra security.

Figure 10:
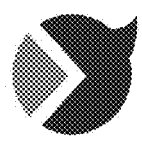
FIG. 10 describes some usability features of the system.

FIG. 10 describes some usability features of the system. The usability features include that the system and approach work across every e-mail system. The Web version makes it easy for you to read the message, even if you are not a subscriber. For example, a person might be sending a message to another person who is not familiar with the system. This is not a problem because embedded in every message is a link to allow the receiver to read the encrypted message instantly. All the receiver has to do is verify that receiver's e-mail address the receiver's own e-mail address. This is done by the receiver hitting the link in the e-mail which automatically generates a subscription link that goes back to the original e-mail sender account. So long as the receiver is the person who the sender sent the e-mail to, the receiver can read the message. And if a one time password is needed, a pop-up window requests entry of the password.

Figure 11:
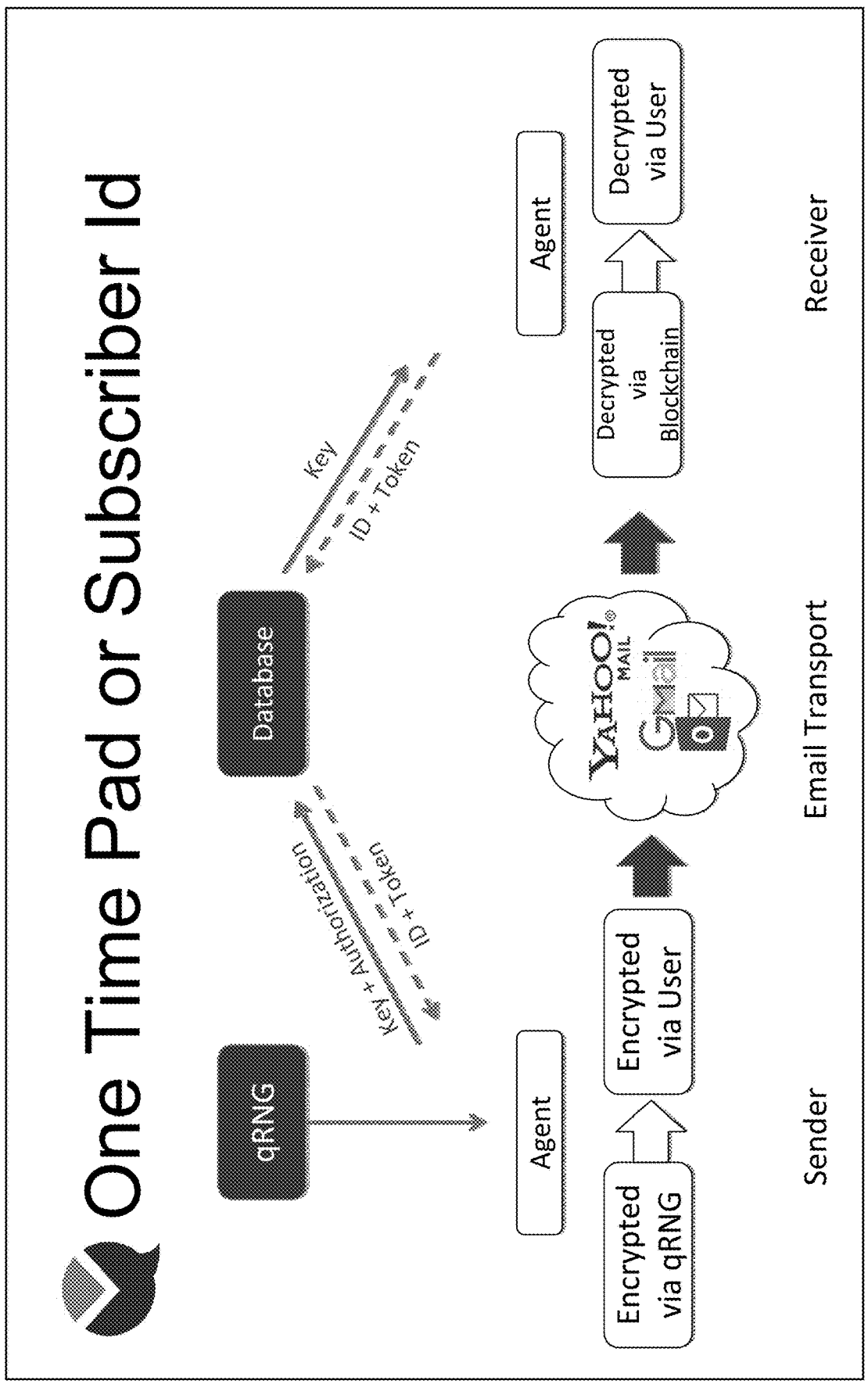
FIG. 11 shows a one-time pad or subscription ID with a database or blockchain.

FIG. 11 shows a one-time pad (OTP) or subscription ID with a database or blockchain. A message is encrypted the first time using the quantum number and then it is encrypted by the user. And then on the opposite side, the decryption approach is a reverse of the encryption.

In cryptography, a one-time pad (OTP) is an encryption technique that cannot be cracked, but requires the use of a one-time pre-shared key the same size as, or longer than, the message being sent. In this technique, a plaintext is paired with a random secret key (also referred to as a one-time pad). Then, each bit or character of the plaintext is encrypted by combining it with the corresponding bit or character from the pad using modular addition. If the key is (1) truly random, (2) at least as long as the plaintext, (3) never reused in whole or in part, and (4) kept completely secret, then the resulting cipher text will be impossible to decrypt or break.

Figure 12:
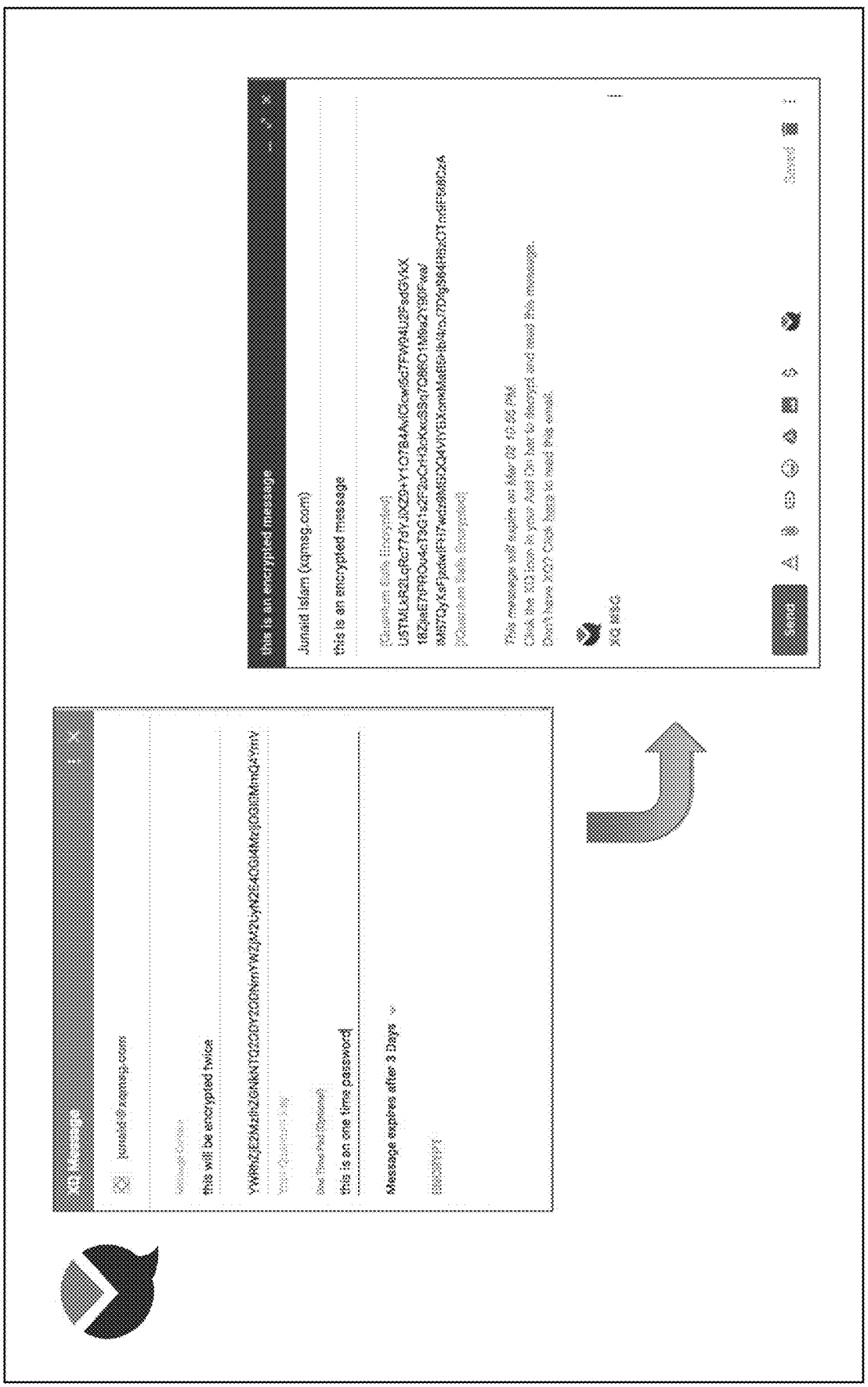
FIG. 12 shows some sample screenshots.
Figure 13:
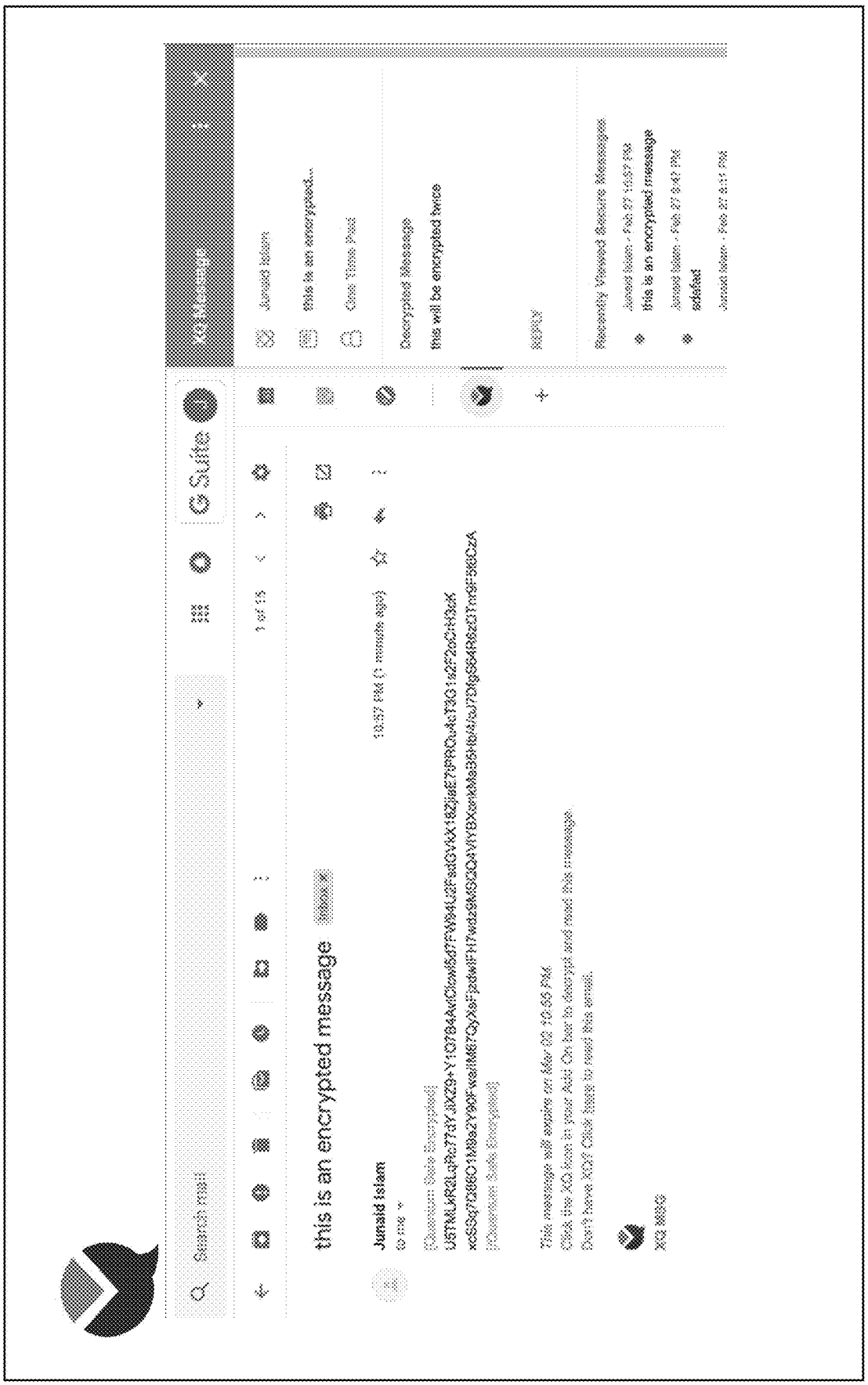
FIG. 13 shows an example of an encrypted Web e-mail from a receiver's point of view.

FIG. 12 shows some screenshots. A sender can encrypt these messages and it injects it in this specific implementation case into Google Gmail. FIG. 13 shows what it looks like in Gmail from the receiver's point of view of receiving this encrypted message.

Figure 14:
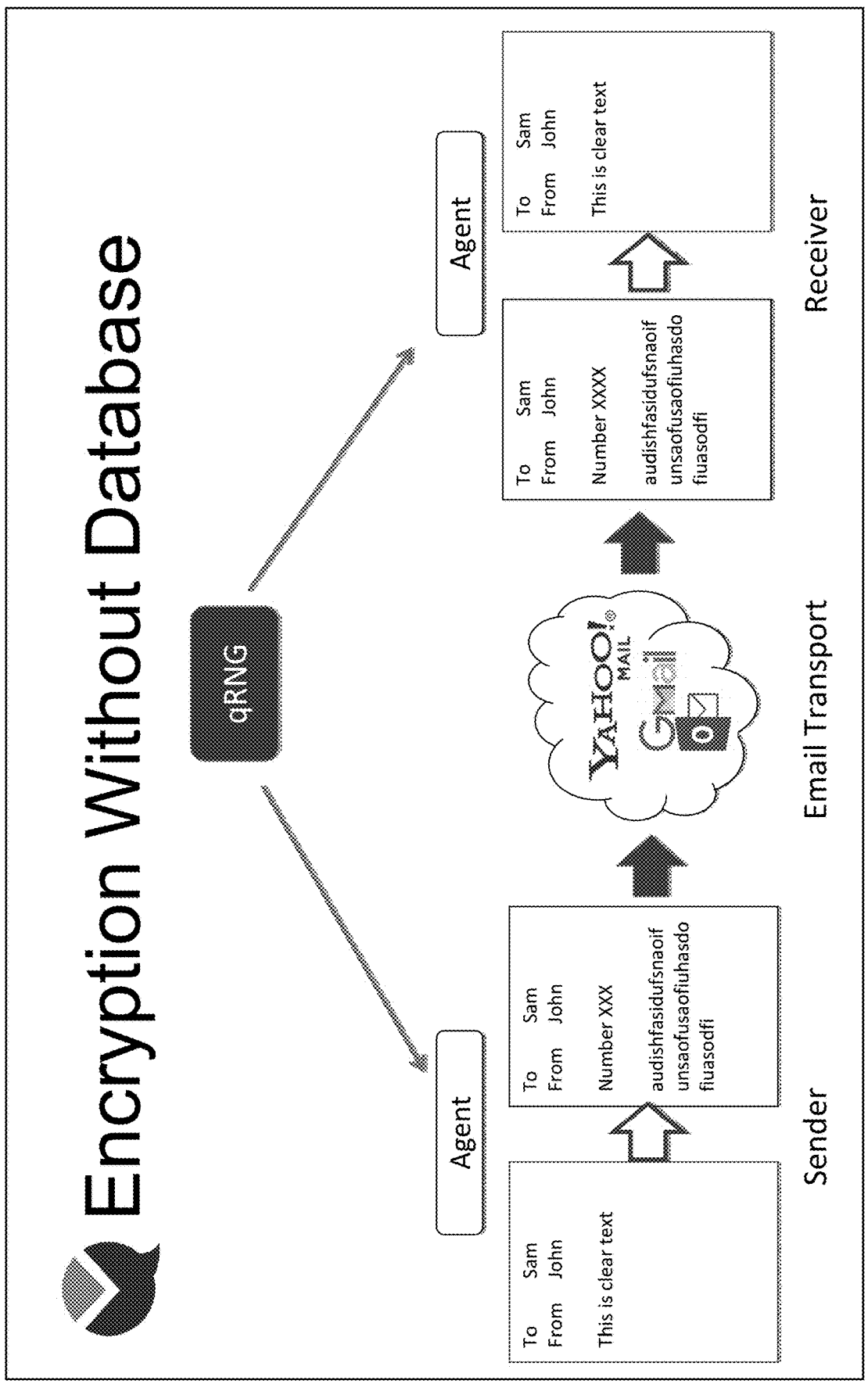
FIG. 14 shows a technique of encryption without a database or blockchain.

FIG. 14 shows a technique of encryption without a database or blockchain, but using only a qRNG. In an implementation, the system has the ability to encrypt messages and allow people to read the message without a database. This is a variation of the technique described above. In the above approach, the quantum number comes to the edge at one point. And then the system uses the quantum number to encrypt and then the system publishes the number to a blockchain. There is also a variant on this, which the system can also do.

For example, both of the sender and receiver get quantum numbers. Both sender and receiver can receive or obtain many quantum numbers, such as 10,000 different quantum numbers. Then, the sender could send a message to the receiver and state that the message is encrypted with a specific combination of four sets of quantum numbers from the set of quantum number that both sender and receiver have.

In this way, that message about which quantum numbers were used in the encryption is actually carried in the message itself. If someone were to hack into the system, they would require the library or set of quantum numbers that both sender and receiver have. Also the hacker would still need the one-time password. Thus, the message remains very secure. The system is flexible. This system does not require a database since everything is done at the edge.

For the implementation in FIG. 14, to decrypt a message, when the message is sent, the message includes information about the random numbers used to encrypt the message. Random numbers are going to agents at both ends, sender and receiver. By comparison, in database case, there is one working random number that only goes to the sender. The sender uses that random number to generate an encryption key and then puts the rules to get that encryption key into the database or blockchain.

In the no-database case, the same set of random numbers is sent to everyone in the system, or at least to the sender and receiver. The message cannot include the encryption key. But the message can tell the agent on the other side, which has a similar set of random numbers, which random number to use to perform the decryption.

There are advantages and disadvantages of this approach. One of the pros or advantages is that there is no database. An advantage is that people have to be able to get the random numbers securely without the hacker getting them. A technique to do this is that random numbers are always changing and all the agents are synchronized and listening at the same time. The agents would be continuously monitoring the random numbers.

Each agent would have a memory or buffer to store the random numbers. There may be limit of how many random numbers can be stored, limited by the memory size. The buffer may be organized as first-in, first-out queue. The system works if everybody has the same copies of the random numbers and that the random are synchronized.

This approach is a very secure because no one can know what a user is doing. In the database approach, others might see a laptop connecting to the database, and then guess what that person is likely to be working on. But in the no-database approach, there is not a way to figure out who is doing what. There is no feedback loop. The agents never disclose what they are doing. The agents are just listening on the Internet for the random numbers. Further, the agents can use a number sent at a specific time in the past.

Further, there are ways to group recover. For example, a receiver agent can get a message and recognizes it does not have the specified file or number. This agent can send a message back to the sender agent and request that a different file or number be selected.

Figure 16:
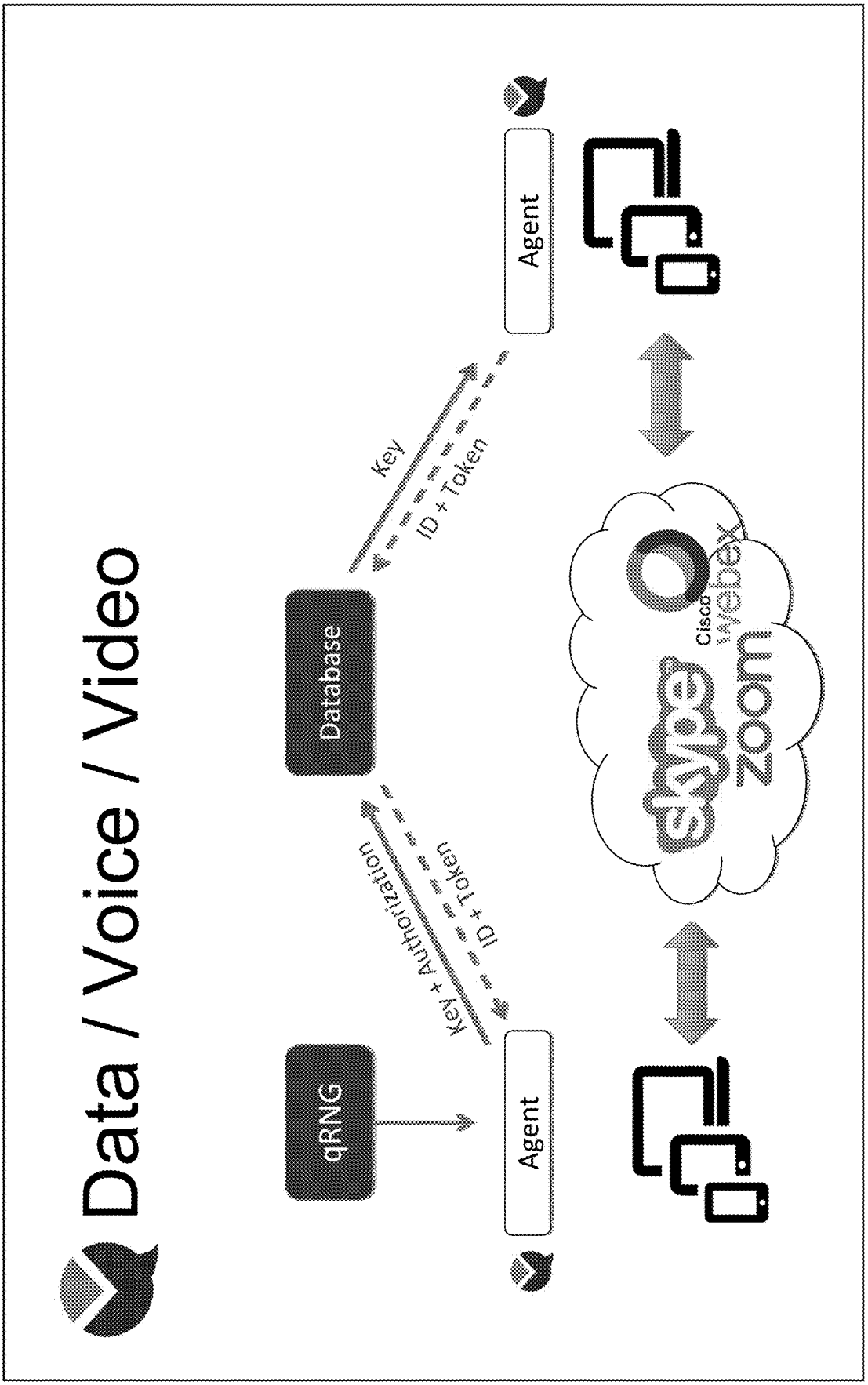
FIG. 16 shows an architecture of the system for working with data, voice, and video.

FIG. 15 shows an example where the system can be used to send documents or attachments. With browser apps, a user can drag the document into a browser window, and the document gets uploaded. With the system, a user drags the document into a window, then the document gets automatically encrypted and gets injected into the e-mail like an attachment FIG. 16 shows an architecture of the system for working with data, voice, and video. The data can include e-mail, text, and documents. Anything can be encrypted by the system. For example, a user can be a video conferencing, such as using Skype or Zoom, with another user. The system could for example encrypt the audio driver the computer or laptop.

This is similar to the situation of e-mail encryption described. A user is able to send a message on any e-mail system in the world, because the system is not changing the e-mail system. The e-mail system does not even know that the encryption system exists. The result of the encryption appears as text to the e-mail system. Similarly, a user's computer or laptop has audio drivers to connect to the microphone. The system can replace those drivers with custom drivers that accept an encryption key.

In this way, by altering the drivers, the system would we would be able to scramble the audio and video. But this makes is transparent to Skype or Zoom. Skype or Zoom would not even know the system is encrypting the voice. Encryption of voice communication is desirable because some users are nervous about someone listening in to their call. With this mechanism, the system and approach is extendible to encrypting audio and video.

As a further example, a first person can receive a call (e.g., Skype or Zoom) from a second person. There is an agent. The agent let the first person know the call is from the second person. Then the first person can hit a button on the agent that lets the agent know to decrypt this call. The agent recognizes this is a call from the first person to the second person. This is the first person because an identifier, such as a Skype ID. The agent will contact the blockchain or database. The database sends the encryption key, and now the agent will be able to dynamically decrypt call, audio or video, or both).

Figure 17:
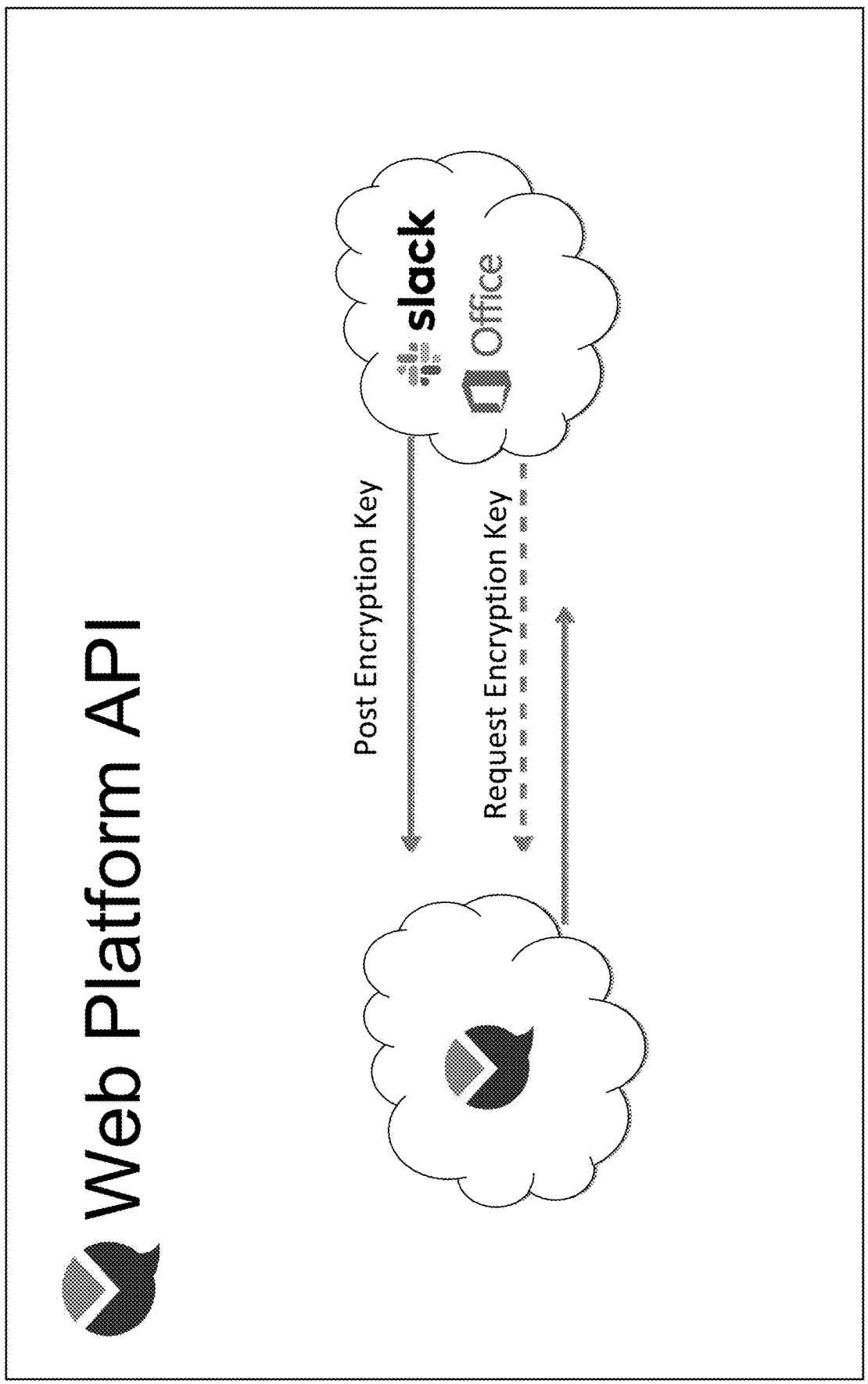
FIG. 17 shows an example of the system in use with a Web platform.

FIG. 17 shows an example of the system in use with a Web platform application program interface (API). In addition to e-mail, the system can be used with other Web platform APIs. There are many platforms, such as Slack, which is a platform used by engineers to share ideas on software. And there are also platform's such as Microsoft Office 365, which are used for applications such as PowerPoint, Word, Excel, and so forth.

These systems have APIs. So, these APIs can be used to encrypt documents and interface with the system directly. The system can store the encryption key, and then on request, give the encryption key back to the systems.

Someone may want to encrypt everything on at their computer using as a service. They do not have to get everybody at the company to install an agent. If the system supports APIs in the process of creating, for example, a PowerPoint. When just storing the PowerPoint, the system can immediately give a user an encryption key in real time. The user could use the key to encrypt the PowerPoint. So with the Web API, the system encrypts as it uploads, or as it is working on in the cloud.

For example, with a Web API, a company is using a Web-based service like Office 365. Those systems support encryption APIs. So they could make a call to our system and when they request an encryption key right, the system will give them a key. And then the system will also receive the policies that allow people to get the key to encrypt. So for the e-mail situation above, there were policies like time (e.g., three days), identity (e.g., you know who is it going to), or policies (e.g., extra passwords). So similar policies are received at our system As an example of a policy for a Web API situation, a person has a PowerPoint. A policy can be to allow everyone in a particular law firm to encrypt and decrypt. If the user is a doctor, then a policy might be that everyone at the hospital who is an employee can look at an X-ray form the doctor.

This allows setting of global policies. Similarly to the e-mail system describe above, the system at the hospital would know the identities of all the people. So someone gets the encrypted e-mail or X-ray. The system knows this is an employee. The system will now contact the system and ask for this decryption key. The API says the request is coming from someone who is an employee. So this allows the system to take the same features used for an individual and scale to the enterprise size. The whole enterprise could be encrypted by the system.

The system can have additional options or policies available to the user. These options can be used to improve the security and privacy of the user's data and information. These options include any of the following, in any combination.

1. Expiration of encrypted data (e.g., messages or e-mail). A default of the system is to have a specified period of time after which the encryption key is deleted, so that the encrypted data can no longer be recovered. This period of time can be, for example, an hour, two hours, three hours, one day, two days, three day, one month, and other time periods. After the specified time period as expired, the encryption key (which can be used to decrypt the encrypted data) is deleted from the encryption key server. Then, the encrypted data can no longer be unencrypted by the recipient.

In an implementation, the user can select the period of time for expiration (e.g., seconds, minutes, hours, days, or months) or a date on which the encryption key is to be deleted. Then the encryption key will be deleted and the encrypted data can no longer be unencrypted by the recipient.

2. Specify a recipient of the encrypted data. The sender can be given an option to specify a recipient of the encrypted data, so that only that recipient can unencrypt the data. If this option is selected, the encryption agent will use a hash function to generate a hash of the recipient's identity (e.g., e-mail address, phone number, login name, or other recipient identifiers or types of verifiable recipient identifiers). This hash is stored with the encryption key at the encryption key server. Then when the recipient wants to unencrypt the encrypted data, the key server will request the hash in order to verify the identity of the recipient. If the hash is the same as stored with the encryption key, the server will send the requested key. If not, the key will not be sent and the data will not be unencrypted.

3. Double encryption by a user-generated password. The sender can be given an option to pre-encrypt the data before encryption using an encryption key generated using the quantum random number. This pre-encryption can be by an encryption technique, using a password that is user generated or supplied by the user (e.g., sender), such as an AES algorithm or one-time PAD (e.g., OTP) algorithm. This pre-encryption algorithm can be different from the subsequent encryption using the encryption key. The agent pre-encrypts the data locally (e.g., at the client) and does not save or send the password remotely. This password will be known only to the sender and whoever the sender chooses to disclose the password to (e.g., the recipient). After pre-encryption or a first encryption, the data is encrypted again (e.g., a second encryption) using the encryption key. The recipient will be unencrypt the second encryption automatically by the agent, but not the first encryption without the password. Only those who have the user-generated password will be able to view the original, unencrypted data.

Figure 18:
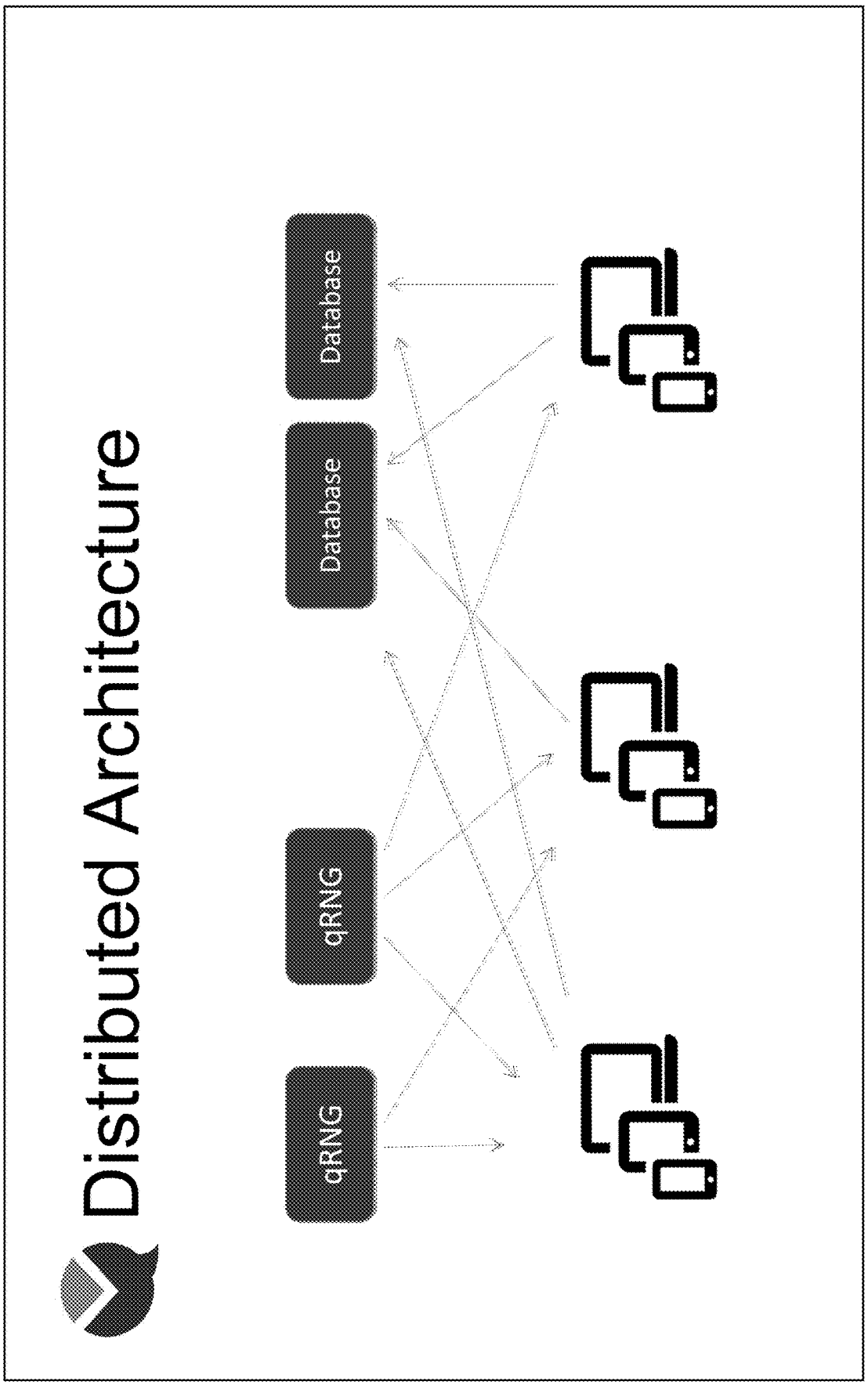
FIG. 18 shows a distributed architecture.
Figure 19:
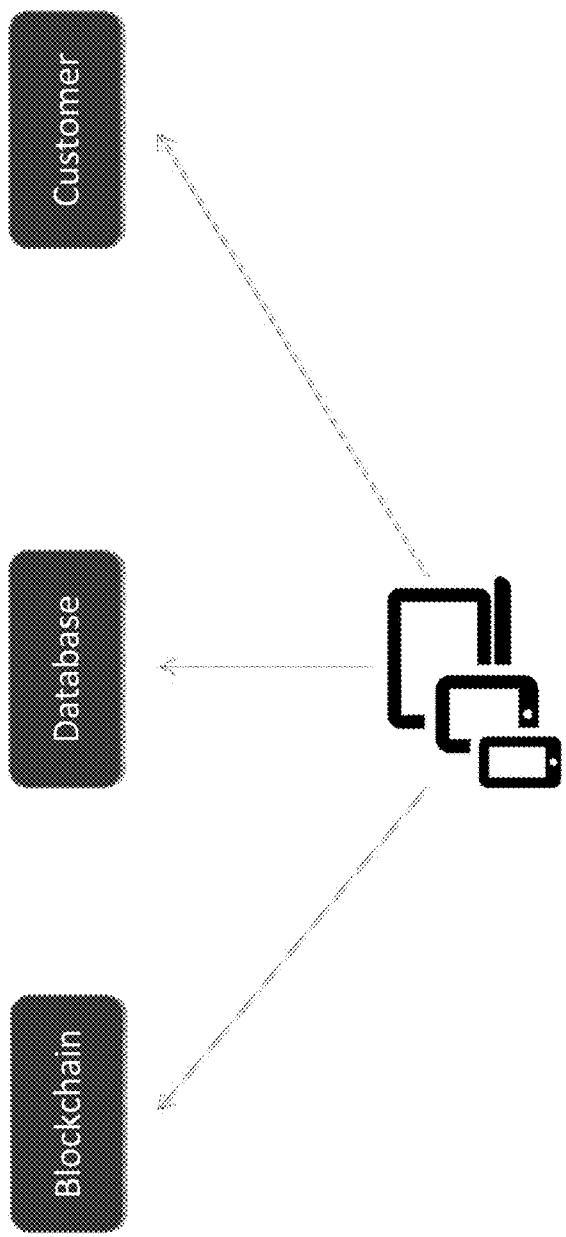
FIG. 19 shows multiple database options.

FIG. 18 shows a distributed architecture. These architectural features of a system. For example, one can scale the system to an arbitrarily large size by increasing the number of quantum number generators. For example, there can be 10 quantum number generators. Similarly, the database and blockchain can be scaled. The system does not need to have only one. There could be 10. There could be 100. The components (e.g., qRNG and blockchain database) not connected with each other FIG. 19 shows multiple database options. There are various backend database options. The system can use a blockchain, a database, or a customer's database. There are situations, like hospitals and lawyers, where the users are more comfortable having the database on their own premises. In a situation with an enterprise client, for example, the system can have a dedicated database for that client.

With multiple qRNG or databases, to find or connect to the correct server, the agents can be synchronized or hunt. For example, if there are 10 server possibilities, the agent can go to the first one on record. And the database can respond that it does not know the person. Then the agent can to the next server.

Figure 20:
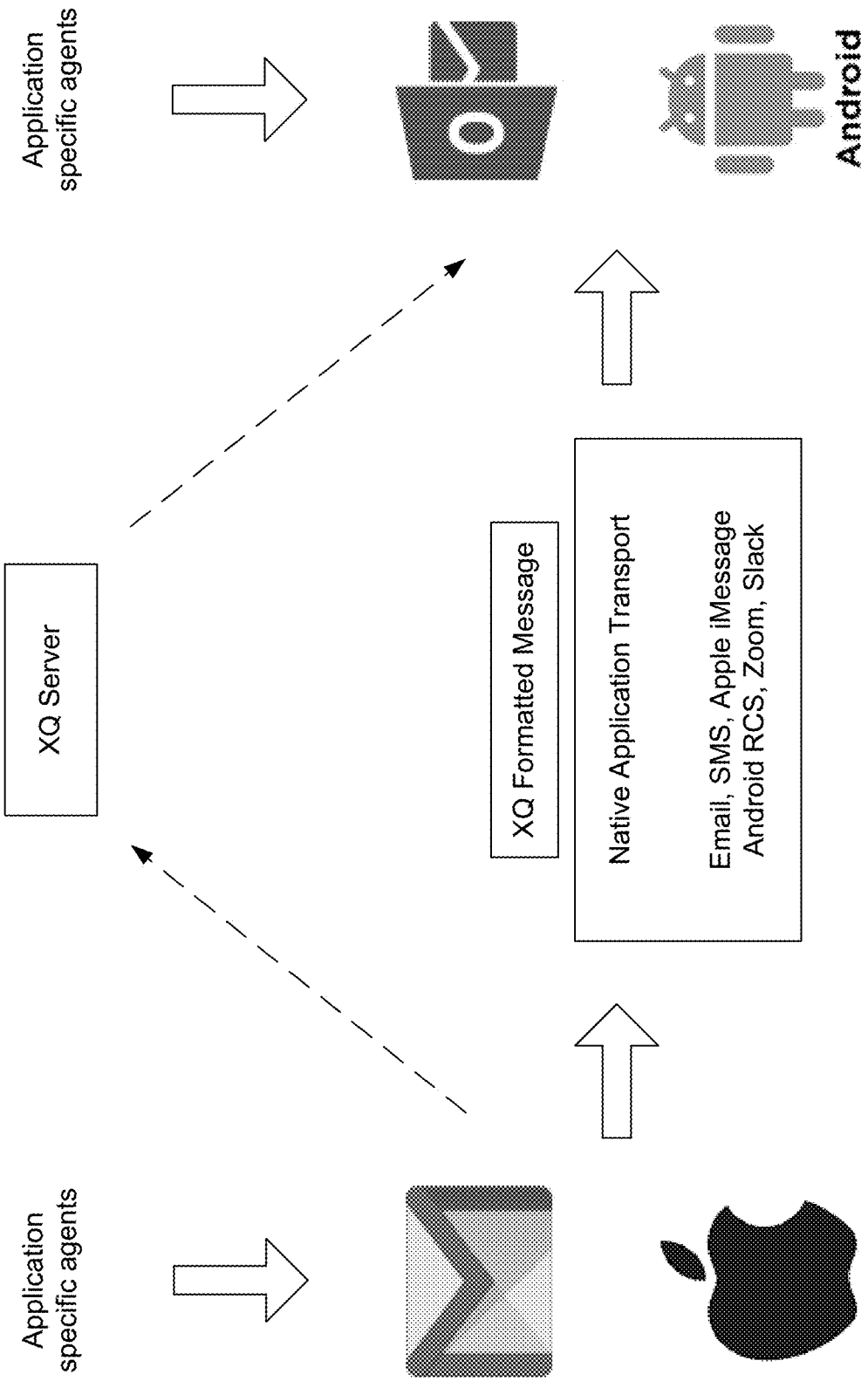
FIG. 20 shows an overview of a cross platform messaging system.

FIG. 20 shows an overview of a cross platform messaging system. XQ Message is a specific implementation of encrypted messaging or private messaging. More information on XQ Message is available at the xqmsg.com Web site, which is incorporated by reference as of the date of this patent. XQ Message is the first quantum safe messaging platform available to the public. With XQ technology sending a message securely is super simple. XQ message provides encrypted messaging in Slack, Apple's iMessage, and other mobile apps on Apple iOS, Google Android, and other mobile platforms. XQ message provides encrypted messaging for Microsoft Outlook, Gmail Gsuite, Gmail Chrome, and others.

In brief, a flow of XQ message includes:
1. XQ app client encrypts user input data into XQ formatted message.
2. XQ encryption key wrapped with mega tag identifying message and posted to XQ server.
3. XQ message travels via native service of the app.
4. XQ app client detects XQ formatted message and sends message identifier to XQ server.
5. XQ server send encryption key for message identifier to app client if policy is OK.

Referring to FIG. 20, a sender uses application specific agents (e.g., Google Gmail or Apple iOS applications, and others) to send an XQ formatted encrypted message using a native application transport, such as e-mail, SMS, Apple iMesage, Android RCS, Zoom, or Slack, and others to a recipient. The encryption of the original sender's message is handled by the XQ server. The recipient receives the XQ formatted encrypted message via application specific agents (e.g., Outlook or Android, and others). Unencryption of the XQ formatted encrypted message is handled by the XQ server, which is reveal the original sender's message to the recipient.

Figure 21:
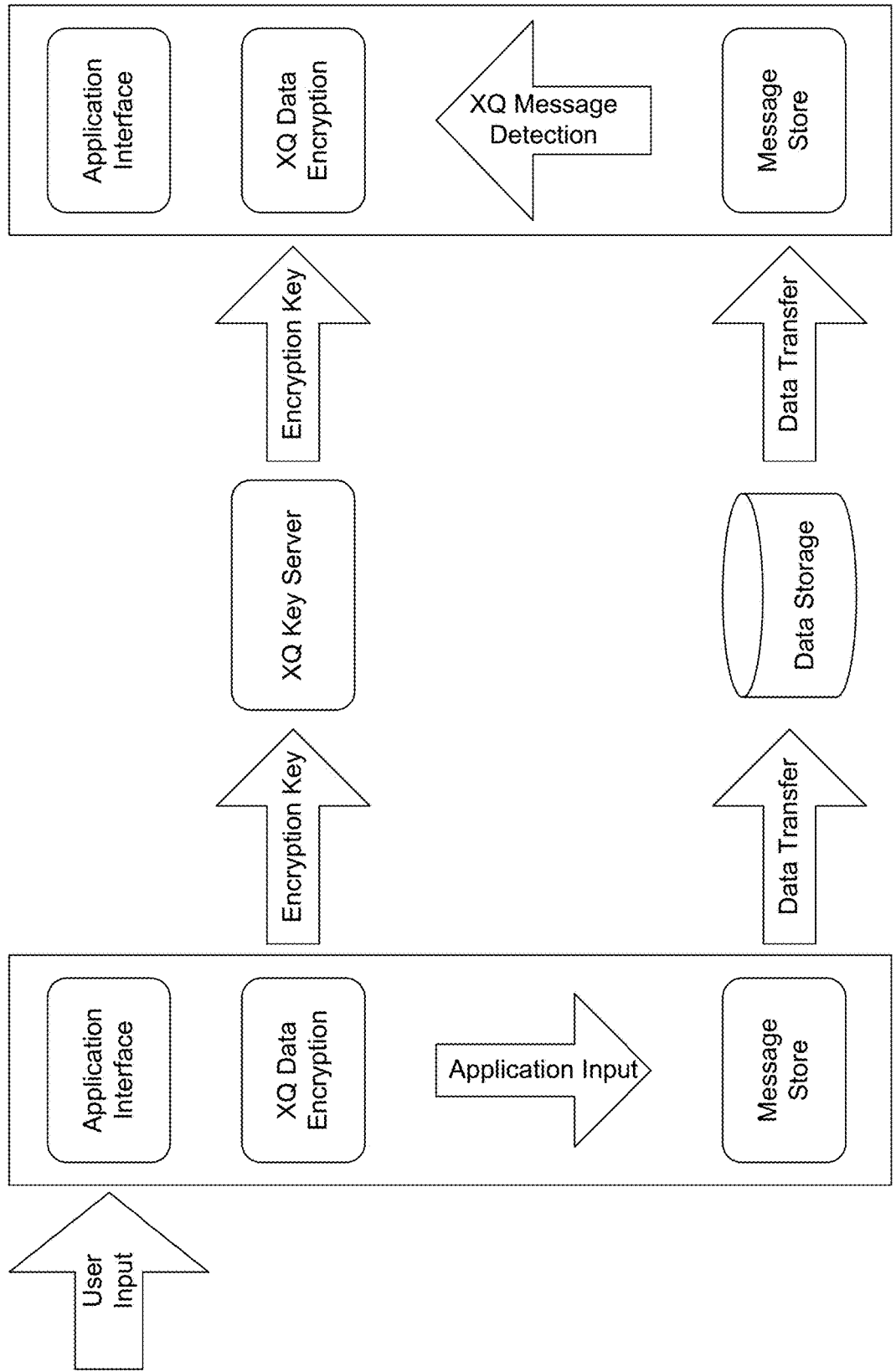
FIG. 21 shows a cross platform messaging workflow.

FIG. 21 shows a cross platform messaging workflow. For example, a sender inputs a message through an application interface and uses an XQ extension (e.g., plug-in, application, helper app, keyboard, or other) to encrypt the data (e.g., message, e-mail, or other information) at the device. The encryption key used to encrypt the data is sent to the XQ key server. The encrypted message is held or stored in a message store at the device, and then transferred to data storage at a server.

The recipient receives the encrypted message via data transfer from the data storage server. An XQ extension (e.g., plug-in, application, helper app, keyboard, or other) detects the message has been encrypted via XQ and can invoke data decryption by retrieve the appropriate encryption key from the XQ key server. Then the message is unencrypted, and can be viewed or otherwise used in its original unencrypted form.

XQ Message allows users to private conversations that "disappear" in Outlook, Gmail, and other applications. XQ works across existing e-mail platforms, lets you set the e-mail lifespan and "unsend" or revoke or recall e-mails.

Revoke e-mails. "Unsend" e-mails by revoking access to encrypted e-mails by the recipients. Just click the REVOKE button and your e-mail is no longer readable.

Message expiration. XQ e-mails "disappear." By default, messages automatically expire after three days and then cannot be decrypted. This way you will have to worry about that credit card number you sent Joe's repair being in his e-mail forever.

Easy to use. It is important that we make sending an XQ encrypted e-mail simple and easy. XQ will let you encrypt and send a secure message in as little as one click. It doesn't get easier than that.

Safe. XQ offers three levels of security to match your needs: instant, personal, and lockdown. XQ uses an architecture using quantum random numbers that is more secure than existing e-mail encryption solutions because super computers and quantum computers have a much harder time hacking it.

Data blind. XQ does not have access to user e-mails and messages because XQ never stores user data. So, others will not be able to access user data through XQ's servers. The encrypted content stays within your existing service (like Gmail) and we provide the logic to encrypt and decrypt the messages.

XQ will make your public conversations private. XQ is the easiest way to secure your e-mail and messages. XQ is truly cross-platform over unsecured networks such as iMessage, Gmail, Outlook, SMS, and all other e-mail systems. Easily send and receive one-click secure encrypted e-mails from Outlook to any other e-mail app. XQ uses quantum safe encryption to edge secure your e-mails and give you a superior level of end-to-end data security. XQ provides one-click secure encrypted e-mails for Google mail. XQ is easy to use, works across existing e-mail platforms and does not allow your messages to be read by anyone except who you want. XQ is for everyone who values privacy, from consumers to lawyers, doctors, financial institutions, and government agencies.

Figure 22:
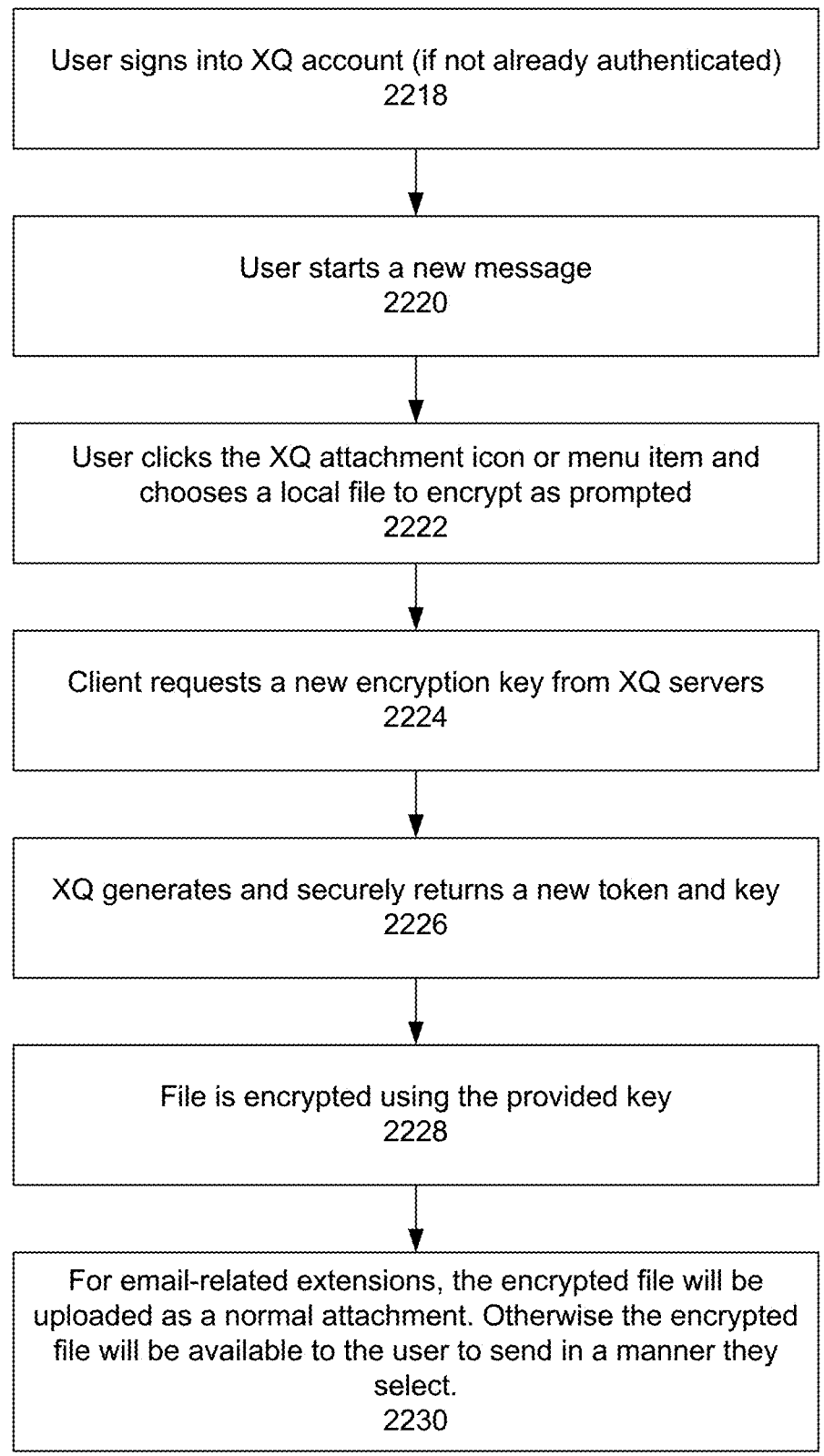
FIG. 22 shows an overall file encryption flow.

XQ servers never have encrypted data (unlike other messaging platforms such as WhatsApp, Signal, Wickr, iMessage, RCS, and others). XQ servers have only the encryption key. Thus, there is no "backdoor" at the XQ side. XQ message format works for both data and voice apps enabling cross platform messaging over any combination of applications. XQ enables end users to create a secure channel over public services real-time audio and video conferencing application like Skype or Zoom as encryption key is only accessible to authenticated users FIG. 22 shows an overall file encryption flow. Encrypted files may be transmitted using any transfer techniques over a network such as e-mail, download, upload, file transfer protocol (FTP), hypertext transfer protocol (HTTP), secure copy (SCP), web distributed authoring and versioning (Web-DAV), bittorrent, and many others. Utilities for encryption and decryption are provided in applications or extensions (e.g., a Chrome Gmail extension) and operate providing server-based tokens, adjustable expiration dates, and other features available in other message techniques.

In a specific implementation, a file format is as follows in table A.

TABLE A

| Field | Byte Size |
| --- | --- |
| Token Size | 4 |
| Token | [Token Size] |
| (Encrypted) Original Name Size | 4 |
| (Encrypted) Original Name | [Original Name Size] |
| Message Payload | [All Remaining Bytes] |

In a step 2218, a user signs into XQ account (e.g., if not already authenticated). In a step 2220, user starts a new message. In a step 2222, user clicks the XQ attachment icon or menu item and chooses a local file to encrypt as prompted. In a step 2224, client requests a new encryption key from XQ servers. In a step 2226, XQ generates and securely returns a new token and key. See also discussion on server encryption process. In a step 2228, file is encrypted using the provided key. In a step 2230, for e-mail-related extensions, the encrypted file will be uploaded as a normal attachment. Otherwise the encrypted file will be available to the user to send in a manner they can select.

Figure 23:
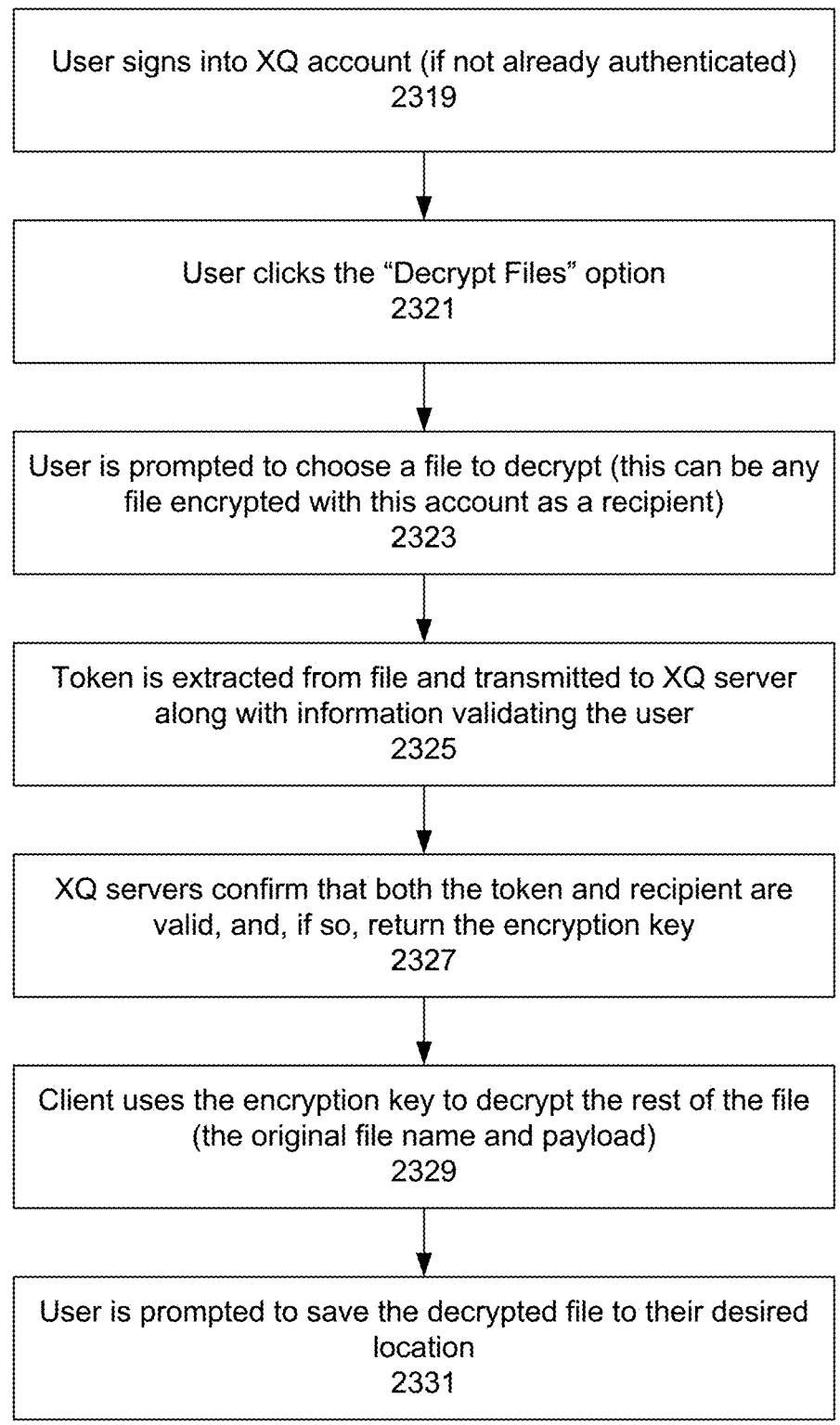
FIG. 23 shows an overall file decryption flow.

FIG. 23 shows an overall file decryption flow. Files can be decrypted simply by providing them to one of the XQ extensions or applications (e.g., that is signed into a valid recipient account). For example, in Chrome, clicking on "Decrypt Files" and then dragging the encrypted file into the window will automatically decrypt the file locally.

In a step 2319, user signs into XQ account (e.g., if not already authenticated). In a step 2321, user clicks the "Decrypt Files" option. In a step 2323, user is prompted to choose a file to decrypt. For example, this can be any file encrypted with this account as a recipient. In a step 2325, token is extracted from file and transmitted to XQ server along with information validating the user. In a step 2327, XQ servers confirm that both the token and recipient are valid, and, if so, return the encryption key. See encryption workflow discussion for detailed process information. In a step 2329, client uses the encryption key to decrypt the rest of the file (e.g., the original file name and payload). In a step 2331, user is prompted to save the decrypted file to their desired location.

Figure 24:
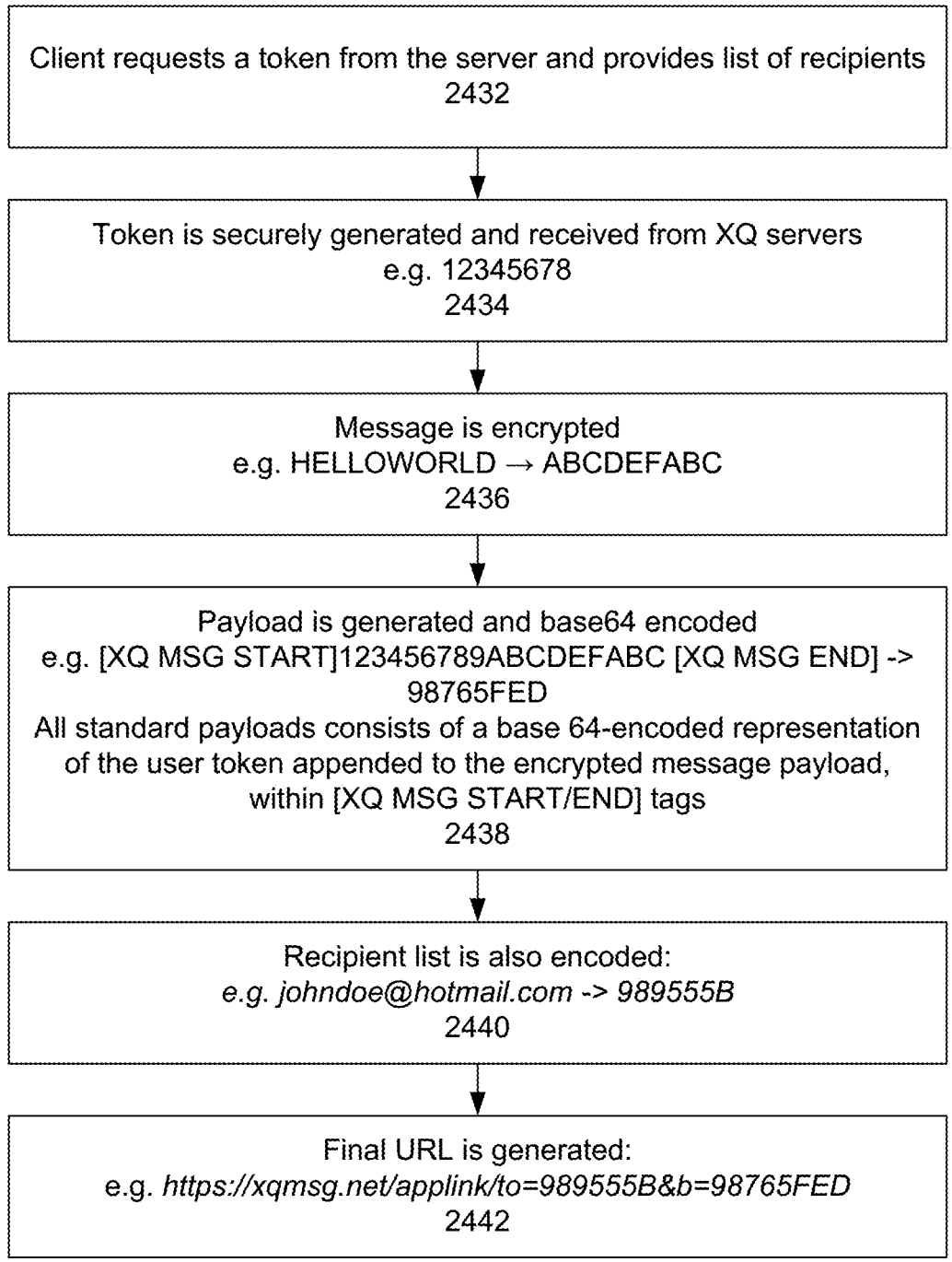
FIG. 24 shows a client-side flow for encrypted message transmission.

FIG. 24 shows a client-side flow for encrypted message transmission. In a step 2432, client requests a token from the server and provides a list of recipients. In a step 2434, token is securely generated and received from the XQ server (e.g., 12345678). See also encryption workflow discussion. In a step 2436, message is encrypted. For example, HELLO-WORLD becomes ABCDEFABC.

In a step 2438, payload is generated and base64 encoded. For example, [XQ MSG START]123456789ABCDEFABC [XQ MSG END] becomes 98765FED. All standard payloads consists of a base 64-encoded representation of the user token appended to the encrypted message payload, within [XQ MSG START/END] tags. In a step 2440, the recipient list is also encoded. For example, johndoe@hotmail.com become 989555B. In a step 2442, final URL is generated, such as https://xqmsg.net/applink/to=989555B&b=98765FED.

Messages that are determined to be too long will have the body (b parameter) broken into multiple sections in order to retain detectability as valid links on, for example, iOS. Without this long links would not be clickable. During decryption, clients will recombine the pieces back into a single string before being decrypted.

Tables below present pseudocode computer program listings of sample software code for a specific implementation of a message encryption system. A table B provides pseudocode for a client request for a token for encryption.

TABLE B

EncryptModule » run
Encrypts the provided text.
Declaration
public func run(
text:String,
algorithm:String,
account:String,
readers:[String],
expiresAfter:UInt64,
quantum:String?,
deleteOnRead:Bool,
completion:((ServerResponse)->Void)? )

TABLE B-continued

Parameters
text The text to encrypt.
algorithm The key of the algorithm to use for encryption (e.g. "AES", "OTPv2").
sender The account (e.g. e-mail address) of the message sender.
readers The account (e.g. e-mail address) of users who should be allowed to read this message.
expiresAfter The number of hours this key will be valid for.
quantum The quantum key to use for encryption. If this is not provided, one will be generated automatically.
completion A block that is called when the process is complete.

A table C provides pseudocode for a message is encrypted using received token. This is called automatically by the run method shown above (based on the algorithm that the user specifies.

TABLE C

XQAlgorithm » encrypt
Encrypts the text fragment using the provided key.
Declaration
func encrypt(
text: String,
key: String,
completion: @escaping (_encodedData: Data?, _ resultingKey: String) -> Void)
Parameters
text The text that needs to be encrypted.
key The encryption passphrase. This will be stored on a remote key server. completion The block that will be called upon completion.
encodedData The encrypted data. This should be nil if the process failed.
resultingKey The key that was ultimately used (the original key could be modified by the algorithm if inadequate).

A table D provides pseudocode for the resulting encoded payload can be handled in any manner the client chooses. In Apple iMessage, the data is base64 encoded, and then converted into a URL during the continueSend method (where the entire process takes place).

TABLE D

IMessageViewController » continueSend
This method is triggered when the extension is ready to process the message (after any optional subscription request is completed).
Declaration
func continue Send( )

Data and Token Storage. A subscription database stores minimal information related to the users identity, while the validation database maintains all messaging tokens. Both operate independently of each other. A table E describes the information stored in the subscription and message validation databases.

TABLE E

| SUBSCRIPTION DATA (Entries created on subscription and login) | MESSAGE VALIDATION DATA ( Entries created on token creation) |
|---|---|
| E-mail Address (for iMessage, these are auto-generated unique addresses, and NOT the users actual e-mail address); Registration data and status Newsletter acceptance | Message token (an automatically generated unique identifier generated initially by the subscription server) Hashed sender information Hashed recipient information (an entry is created for each recipient of a multi-recipient message) |

TABLE E-continued

| | |
|---|---|
| Usage information (updated each time the user makes a relevant API request) | Message encryption key |
| User IP (used for geolocation) | Message expiration date/time |

When a user registers, only the most basic information is retained on the XQ servers. Due to the e-mail and recipients being hashed, just having the content of the database is of little relevance to anyone. Actual addresses would have to be known in order to match up e-mails to tokens. Even full knowledge of the database content would be of no use by itself, as the message payload is never transmitted to the XQ servers.

A specific implementation of XQ Message works with Apple iMessage. XQ message provides private messaging in iMessage. Chat safely in iMessage with XQ and get disappearing text messages. Keep all your app data safe. Send end-to-end encrypted messages through every app on your phone.

Figure 25:
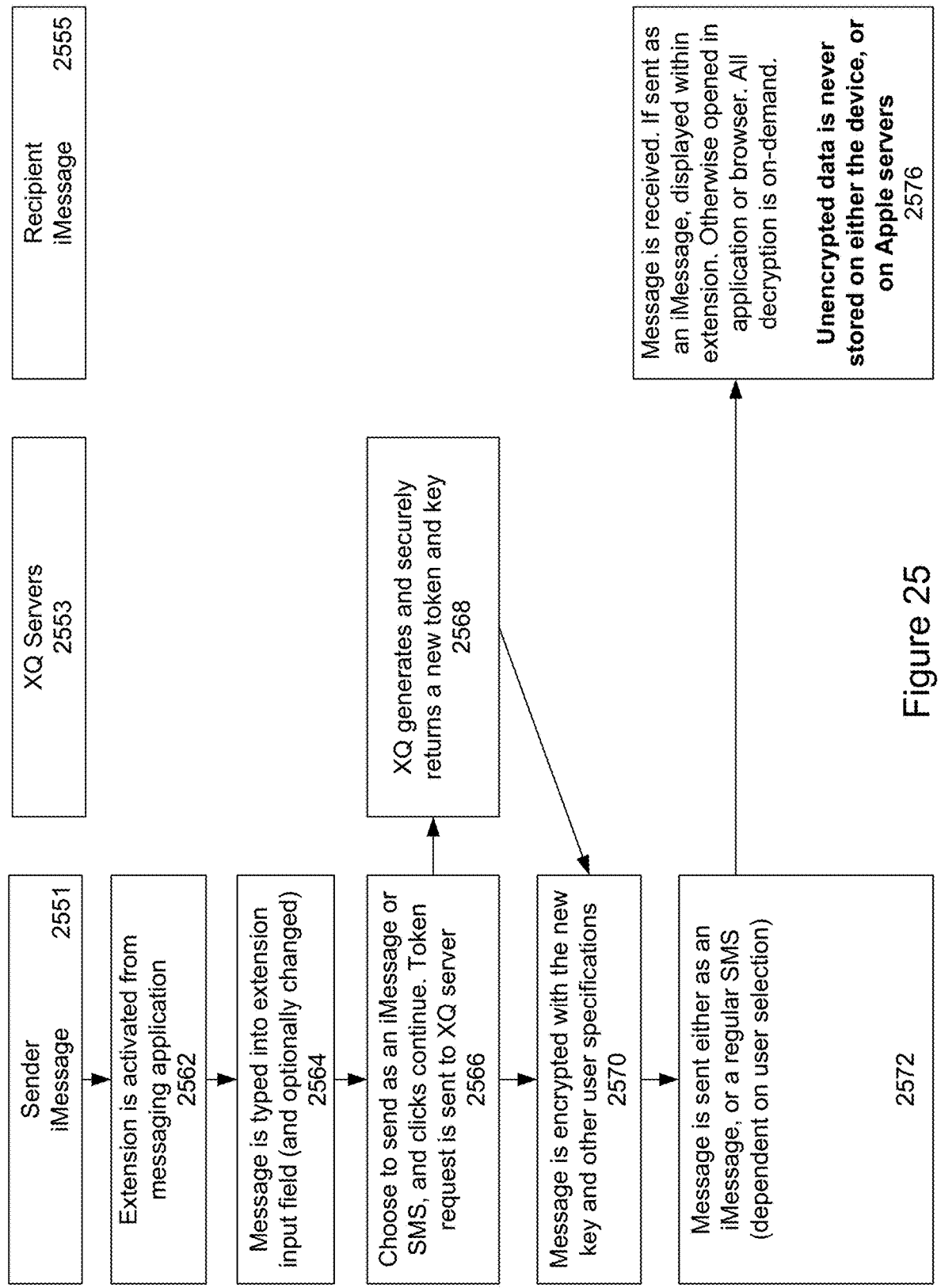
FIG. 25 shows a system diagram of a specific implementation of private messaging.

FIG. 25 shows a system diagram of a specific implementation of private messaging through Apple iMessage. In FIG. 25, there are three columns representing three entities, the sender of the iMessage 2551, XQ servers 2553, and recipient of the iMessage 2555.

For the sender of the iMessage, in a step 2562, an extension is activated from the messaging application. In a step 2564, a message is typed into an extension input field (and optionally changed). In a step 2566, the sender chooses to send as an iMessage or SMS, and clicks continue. Token request is sent to XQ server.

In a step 2568, the XQ server generates and securely returns a new token and key. See discussion on server encryption process. In a step 2570, the message is encrypted with the new key and other user specifications. In a step 2572, the message is sent either as an iMessage, or a regular SMS (dependent on user selection).

In a step 2576, message is received by recipient. If sent as an iMessage, the message is displayed within the extension. Otherwise the message is opened in the application or browser. All decryption is on-demand. Unencrypted data is never stored on either the device, or on Apple servers.

Tables F, G, H, and I provide pseudocode related to sending of an iMessage. Table F provides pseudocode for a user activating the extension from within a messaging session.

TABLE F

IMessageViewController » willBecomeActive
This method is called when the extension is about to become active.
Declaration
override func willBecomeActive(with conversation: MSConversation)
Parameters
conversation A reference to the current conversation and message.

A table G provides pseudocode for an extension that expands from the bottom of the screen, giving user a panel to type their secure message (using the same editing functionality available throughout the OS). User can also edit features of the encrypted message (such as TTL, algorithm selection, and optional revocation).

TABLE G

IMessageViewController » refreshContent
Refreshes the current window content.

TABLE G-continued

Declaration
func refreshContent(complete: @escaping ( ) -> Void = { })
Parameters
complete The method to call once the refresh is complete.

Then with the extension, user chooses the type of message they would like to send, either an iMessage or a regular SMS.

A table H provides pseudocode for a user clicking the encrypt button and message is encrypted and URL created. See discussion on encrypted message transmission format.

TABLE H

IMessageViewController » sendClicked
Called when the send button is clicked in the editor.
May behave differently depending on whether delete-on-read is enabled and the user is subscribed or not.
Declaration
@IBAction func sendClicked(_ button: UIButton)

A table I provides pseudocode for if the user selected iMessage, the URL is wrapped within an iMessage data structure and sent as such. Otherwise the URL is inserted as-is into the input text field, where the user can add additional text, or use the injected link as-is.

TABLE I

IMessageViewController » continueSend
This method is triggered when the extension is ready to process the message (after any optional subscription request is completed).
Declaration
func continue Send( )

Table J provides pseudocode for sending of an iMessage. The user receives an XQ message.

TABLE J

Declaration
func process(message: MSMessage, _ manual: Bool = true)
Parameters
message The message to process.
manual Specifies whether the process was triggered by the OS or directly by the user.

If the message was sent as a regular SMS, clicking the link will perform the same default action as clicking that link anywhere else: If the link is recognized as a universal one, it will perform the associated action (e.g., will be opened in the app if installed). Otherwise, it will be opened and decrypted automatically in the client browser.

If sent as an iMessage, the message will be opened inside iMessage within the XQ extension panel. As noted above, data is only decrypted on demand and never stored anywhere. If a message is invalid or expired, the client will no longer be able to retrieve the key to read the message.

FIG. 26 shows a flow for a technique of using a keyboard application that is used to encrypt e-mail or other digital data (e.g., SMS messages, social network posts, and many others) on a device such as a smartphone. In a specific implementation, the keyboard is for Android mobile operating system (or other mobile operating system). A specific application is known as XQ Keyboard on Android. The techniques described apply to software keyboards (e.g., virtual keyboards, on-screen keyboards) on any platform or operating system (e.g., Windows, Android, iOS, MacOS, Linux, console gaming system such as Microsoft Xbox, Sony Playstation, or Nintendo Switch).

The XQ Keyboard (or XQ Android Keyboard) is able to input encrypted text into any app on an Android phone. Android allows for the installation by users which enables them to install the XQ Android Keyboard. To activate the XQ Keyboard, the user first opens an app on their Android phone, then selects the XQ Android Keyboard which creates a pop-up window into which they can type. Once the user hits the enter key, the XQ Keyboard encrypts the text and inserts into the open app. The encrypted text then travels through the open app (WhatsApp, SMS, E-mail, Facebook, and others). On the receiving side the encrypted XQ text appears as a URL link. When the recipient clicks the link it awakens the XQ Keyboard which displays the original text in a pop-up window.

In a flow, the keyboard application is used to (i) write or draft a new message and encrypt the message and (ii) read a new message and decrypt the message.

A write new message flow includes:

1. A keyboard app (e.g., XQ Keyboard) is installed on a phone. The keyboard can be installed from a repository, such as the Google Play store, or may be separately downloaded and sideloaded onto the phone. After installation, the XQ Keyboard can be selected as the default keyboard for the phone.

2. The user activates any application (e.g., e-mail app or messaging app) on the phone.

3. The user can select to use XQ Keyboard (e.g., if XQ Keyboard is not already set up as the default keyboard).

4. The user types input which appears in an XQ Keyboard window.

5. XQ Keyboard encrypts the text input by the user by fetching a qRNG (quantum Random Number Generator) and generating a key and using an algorithm such as AES. The XQ Keyboard application posts encryption key to an XQ encryption key database (e.g., residing on a server, remote from the phone) and receives a message token from the database.

6. XQ Keyboard places the encrypted message into the application (e.g., mail app or messaging app) along with the message token.

A read message flow includes:

1. A keyboard app (e.g., XQ Keyboard) is installed on a phone.

2. The user receives an encrypted content on the phone. The message can be a link such as a URL link.

3. The user clicks on the message (e.g., click on the link in the message), which invokes or activates the XQ Keyboard app.

4. XQ Keyboard retrieves the appropriate encryption key from XQ encryption key database using the message token.

5. The XQ Keyboard app displays the decrypted message in a XQ app window using an algorithm such as AES.

Table K provides pseudocode for an encrypt message module of a keyboard app.

TABLE K

START ENCRYPT MESSAGE MODULE
Text = Get text field content from active text field
Lifetime = Get message lifetime from settings
Algorithm = Get encryption algorithm from settings
Recipients = Get list of allowed recipient emails
Quantum Entropy = Get quantum entropy from server
Access Token = Get current user access token from environment
Secret Key = Generate key using Quantum Entropy
Encrypted Data = Encrypt data with Algorithm TABLE K-continued Add tag indicating Algorithm to Secret Key
Locator Token = Send Access Token, Secret Key, Recipients and
Lifetime to server and receive token
Encoded Message URL = Encode Encrypted Data, Token components
into URL
Replace text field content with Encoded Message URL
END ENCRYPT MESSAGE MODULE Table L provides pseudocode for a decrypt message module of a keyboard app.

TABLE L

Figure 27:
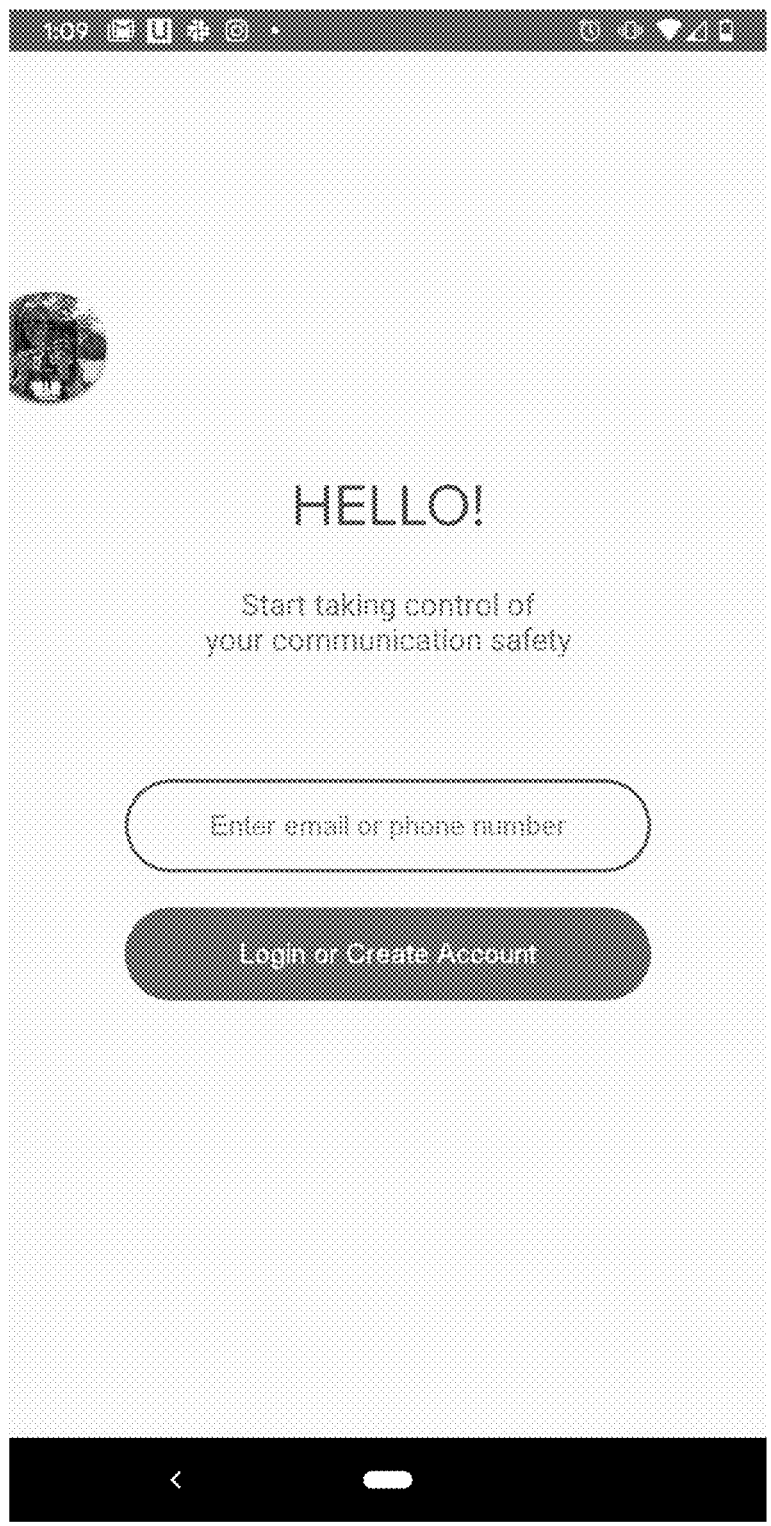
FIG. 27 shows a login screen of a keyboard app for encrypting and decrypting messages.

START DECRYPT MESSAGE MODULE
Message URL = Get the content of selected URL
Decoded Message Object = Decode Message URL into its components
Encrypted Data = Extract encrypted data from Decoded Message Object
Locator Token = Get locator token from Decoded Message Object
Access Token = Get current user access token from environment
Secret Key = Send Access Token and Locator Token to server and get
secret key in return
Algorithm = Extract tag from key indicating algorithm
Decrypted Text = Decrypt Encrypted Data using Secret Key and
detected Algorithm
Display Decrypted Text
END DECRYPT MESSAGE MODULE FIG. 27 shows a login screen of a keyboard app for encrypting and decrypting messages. This is a sample screen for the XQ Keyboard App for Android. After login, multi-factor authentication is used to ensure your messages are hashed with your credentials.

Figure 28:
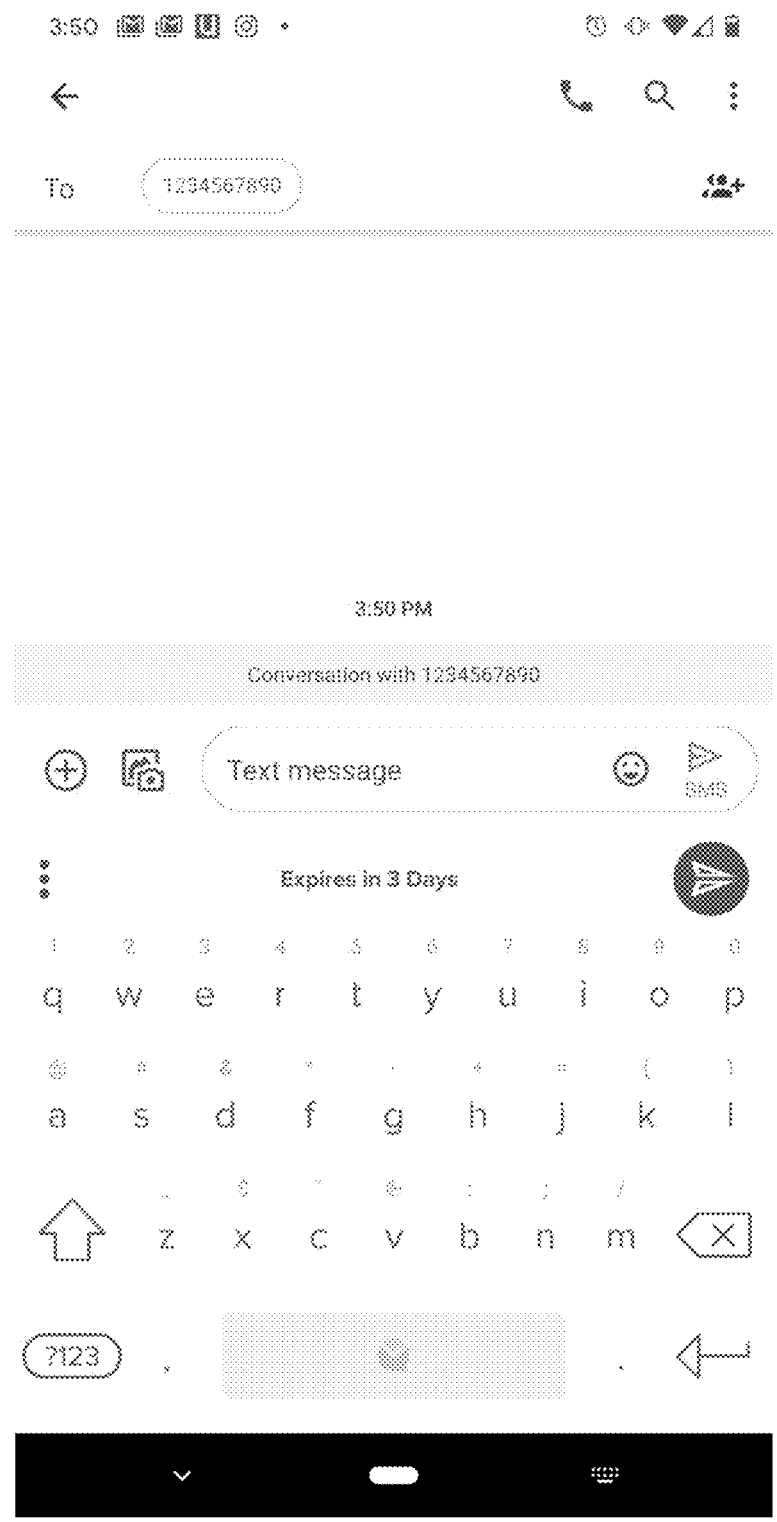
FIG. 28 shows a screen on a device (e.g., smartphone or tablet) of an application (e.g., messaging app) and the keyboard app, invoked by that application.

FIG. 28 shows a screen on a device (e.g., smartphone or tablet) of an application (e.g., messaging app) and the keyboard app, invoked by that application. The keyboard app will be available in all applications. For example, the app may be a messaging app of the device (e.g., smartphone or tablet), or may be an e-mail app. This keyboard app can be used as the native keyboard for applications on the device, replacing the default keyboard. This keyboard app can be on a sender's device for sending of encrypted content to another person, a receiver or recipient.

Figure 29:
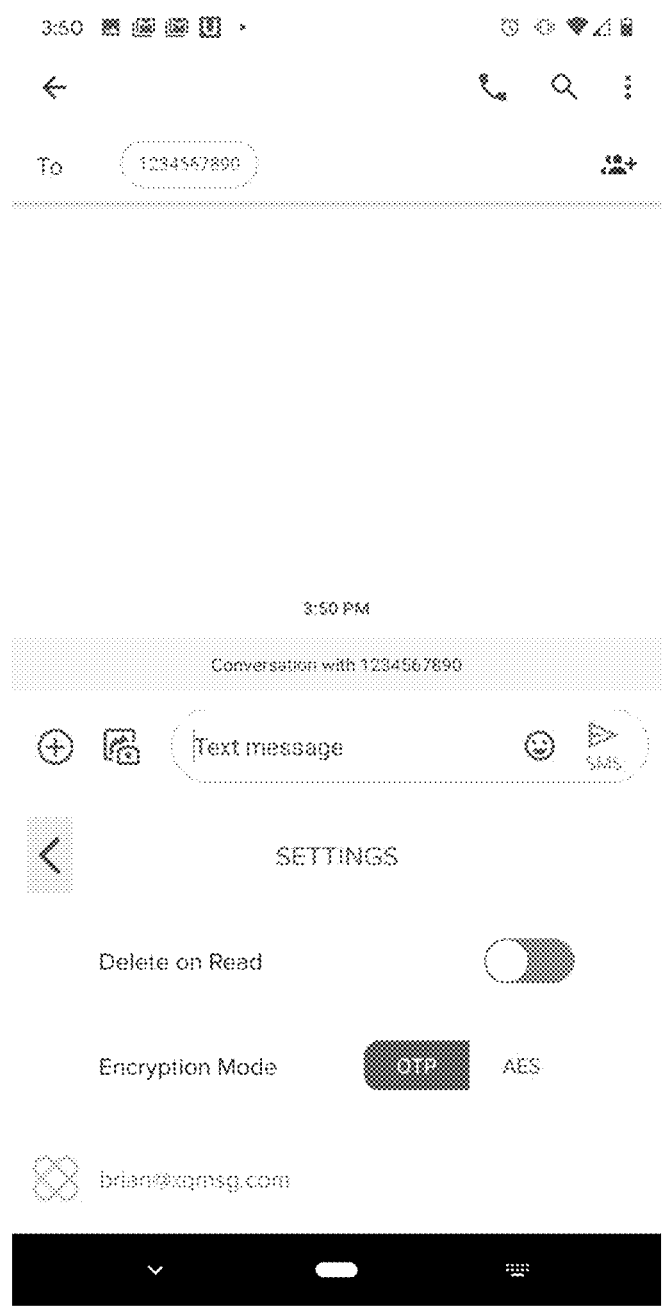
FIG. 29 shows a settings screen of the keyboard app.

FIG. 29 shows a settings screen of the keyboard app. Some of the settings available include:

1. Delete on Read. If this toggle setting is turned on, a user has selected that messages the user sends can only be decrypted once by the recipient.

2. Encryption Mode. With this setting, the user can select encryption algorithm, such as OTP or AES encryption.

3. Logged in Profile. This setting indicates or identifies a currently authenticated account, such as by a login e-mail of the user.

Figure 30:
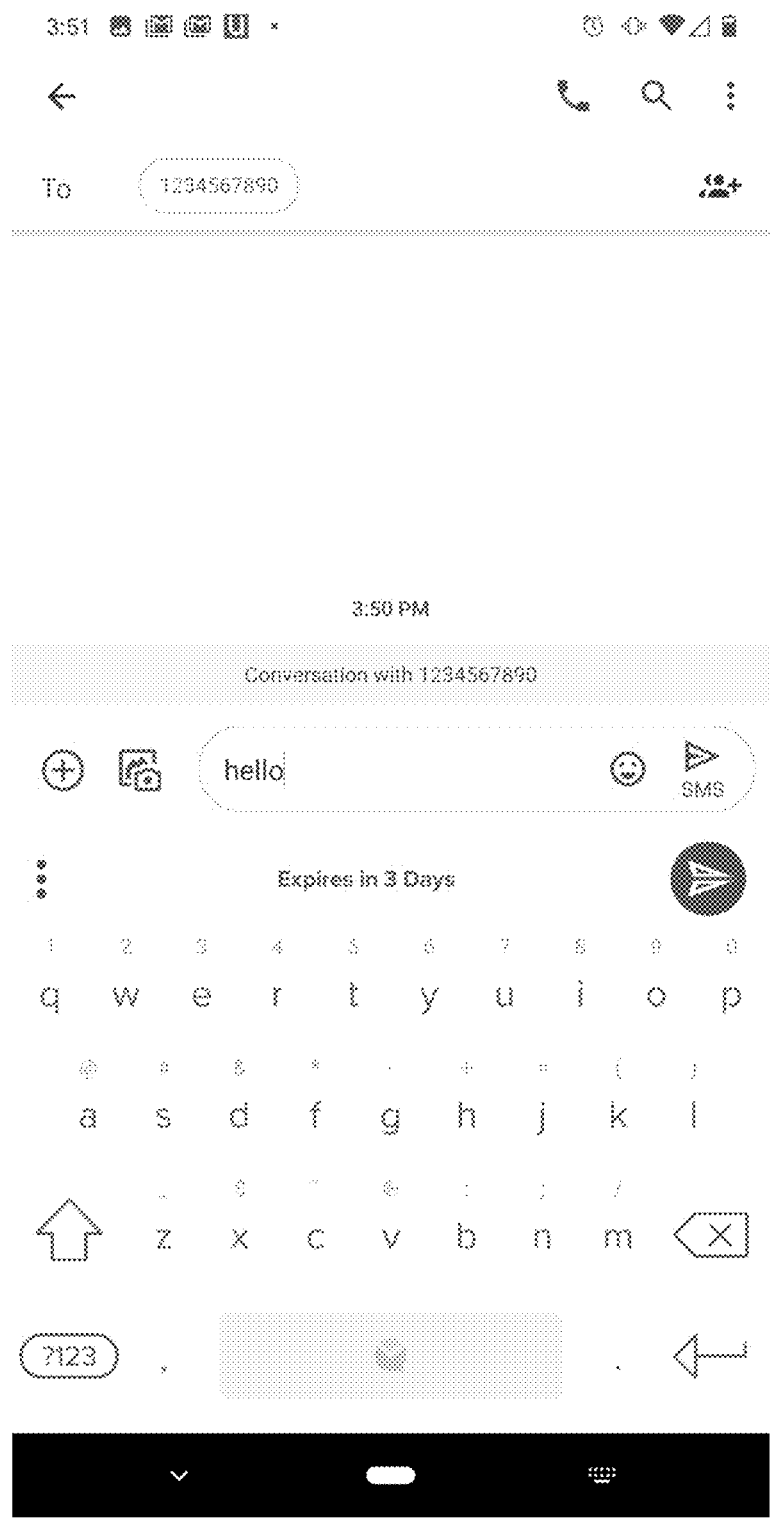
FIG. 30 shows a screen where a user has typed a message using the keyboard app.

FIG. 30 shows a screen where the user has typed a message using the keyboard app. For example, using the keyboard, the user has typed a message "hello." The message to be sent has been created.

Figure 31:
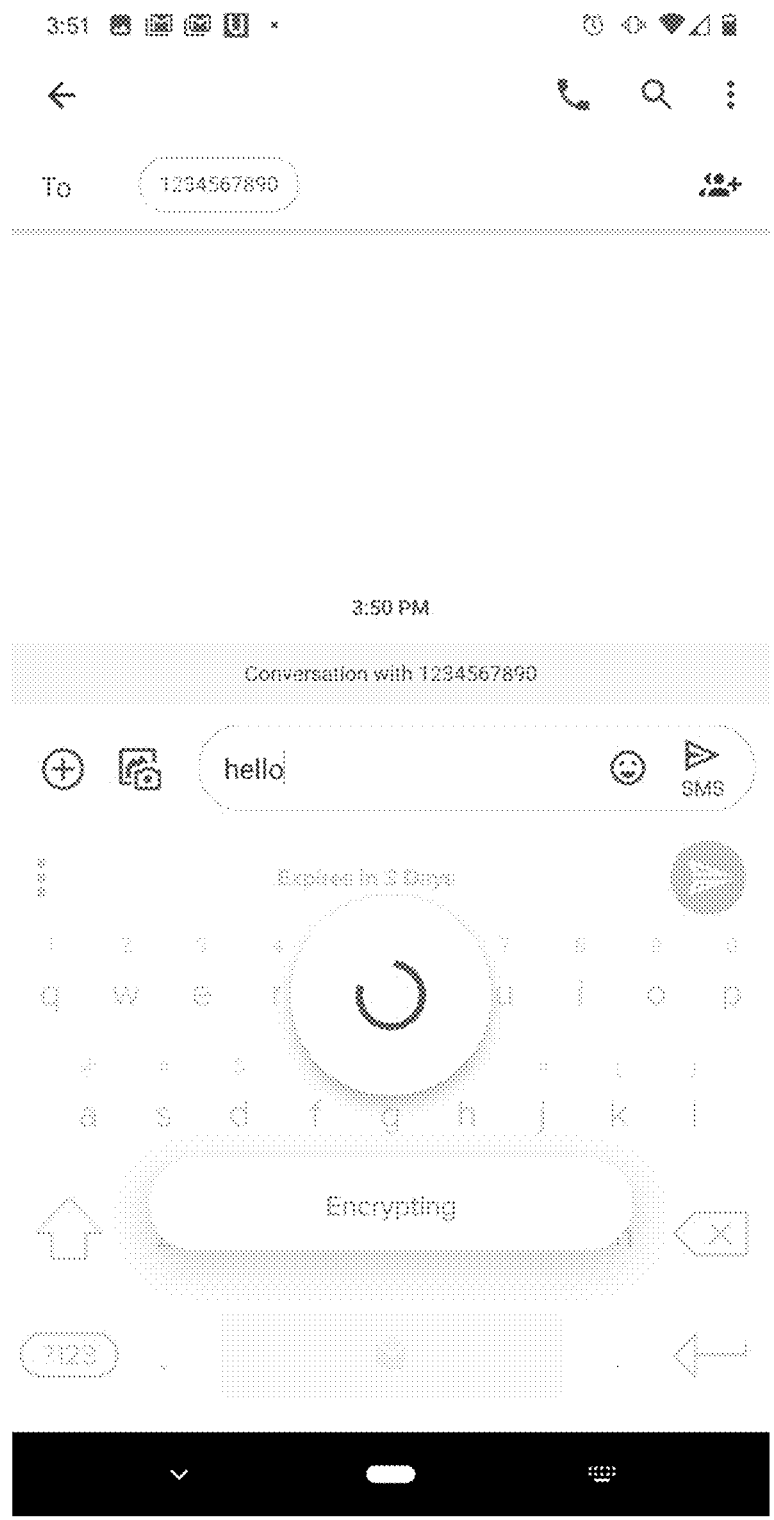
FIG. 31 shows a screen where the message is being encrypted.

FIG. 31 shows a screen where the message is being encrypted. There is a processing indicator while message is encrypted. The encryption can be performed locally on the device (e.g., smartphone or tablet) by the integrated circuits (e.g., processor) of that device. Alternatively, the encryption can be performed with the help of a server or other device accessible via a network connection.

Figure 32:
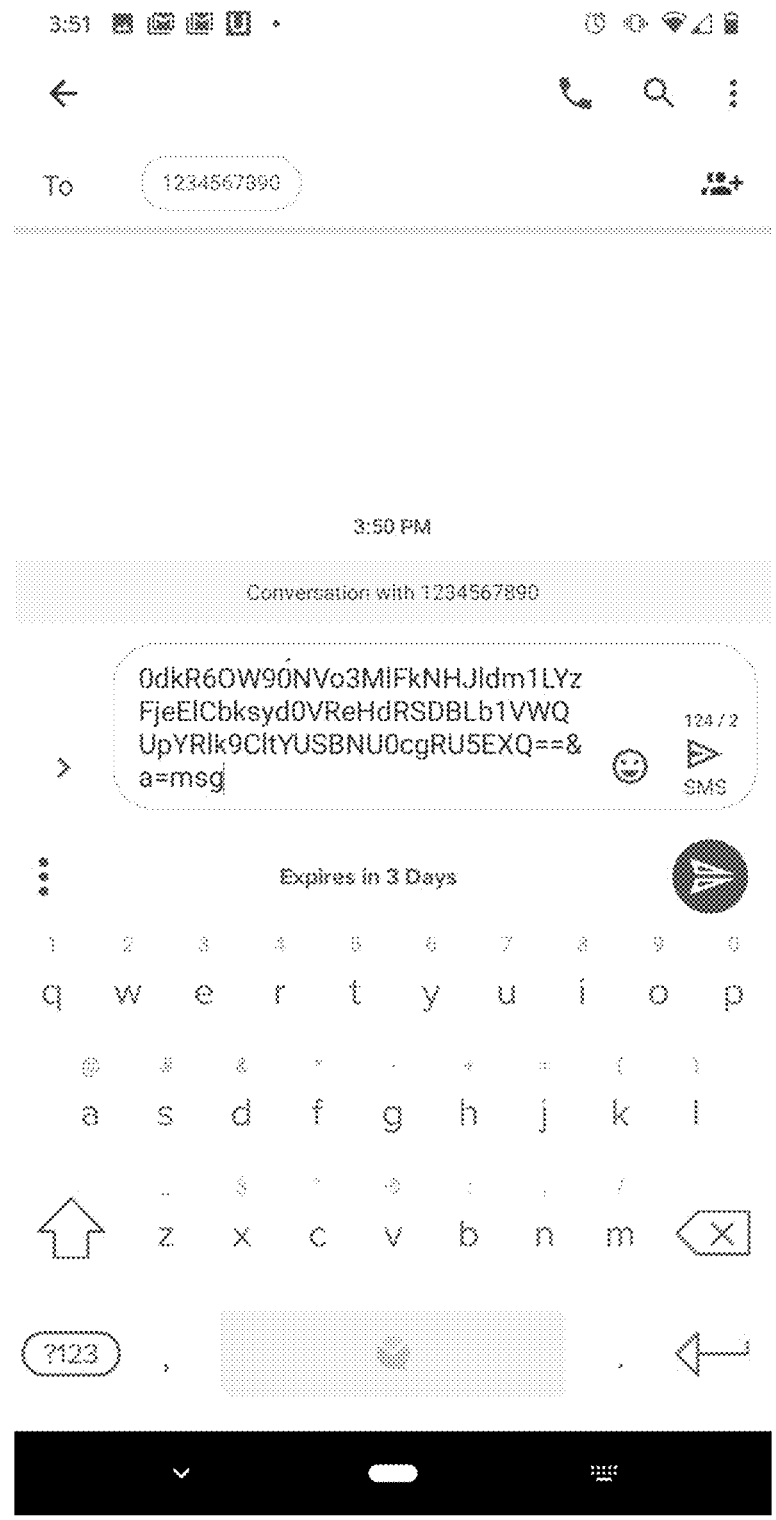
FIG. 32 shows an encrypted message in the keyboard app.

FIG. 32 shows an encrypted message in the keyboard app. The message is encrypted in the keyboard app before it is entered or transferred to the application (e.g., messaging app).

Figure 33:
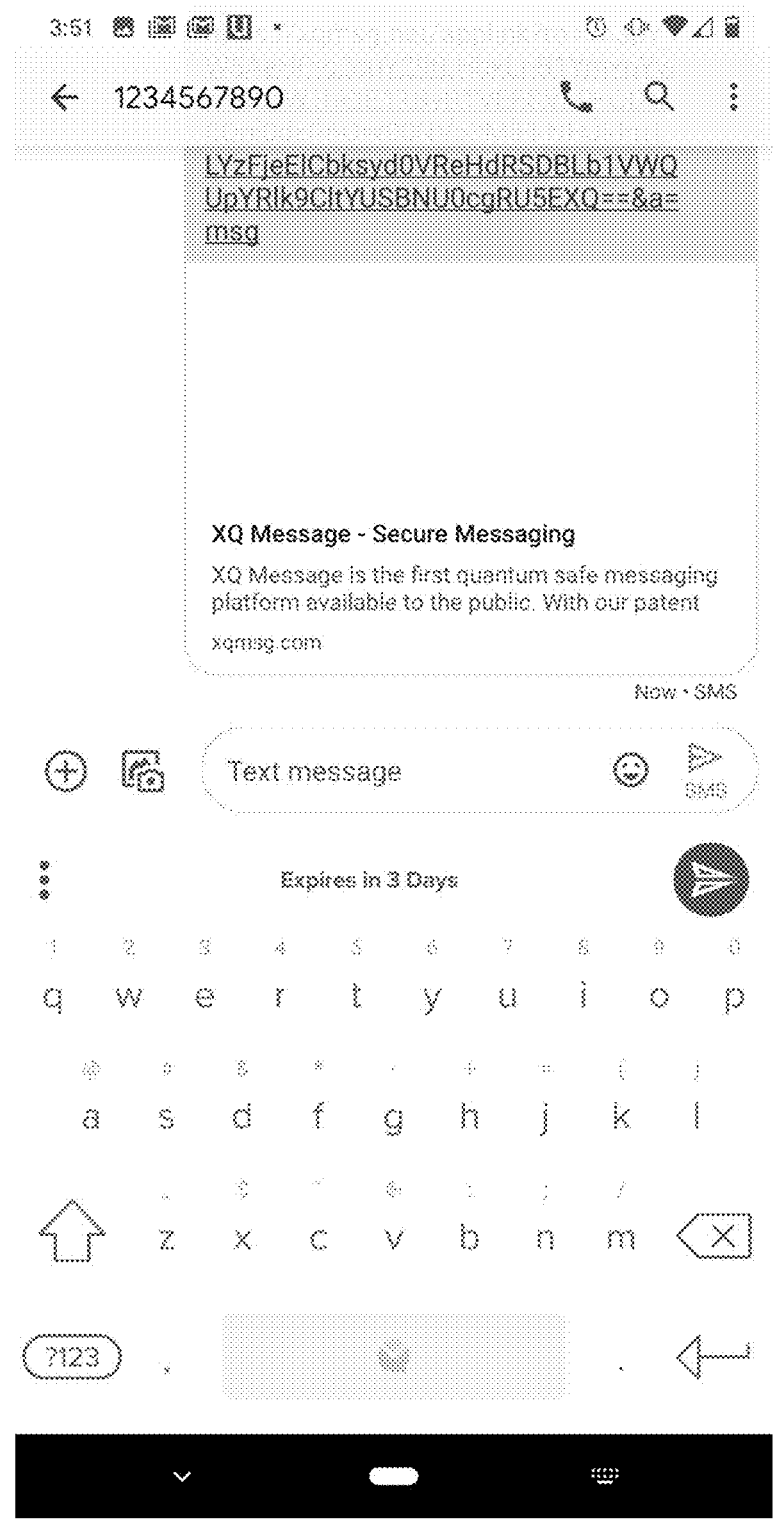
FIG. 33 shows a screen where the message is sent using the application.

FIG. 33 shows a screen where the message is sent using the application. The message is injected into an input field in an app on the device. The message can be a link, hyperlink, or uniform resource locator (URL) link.

Figure 34:
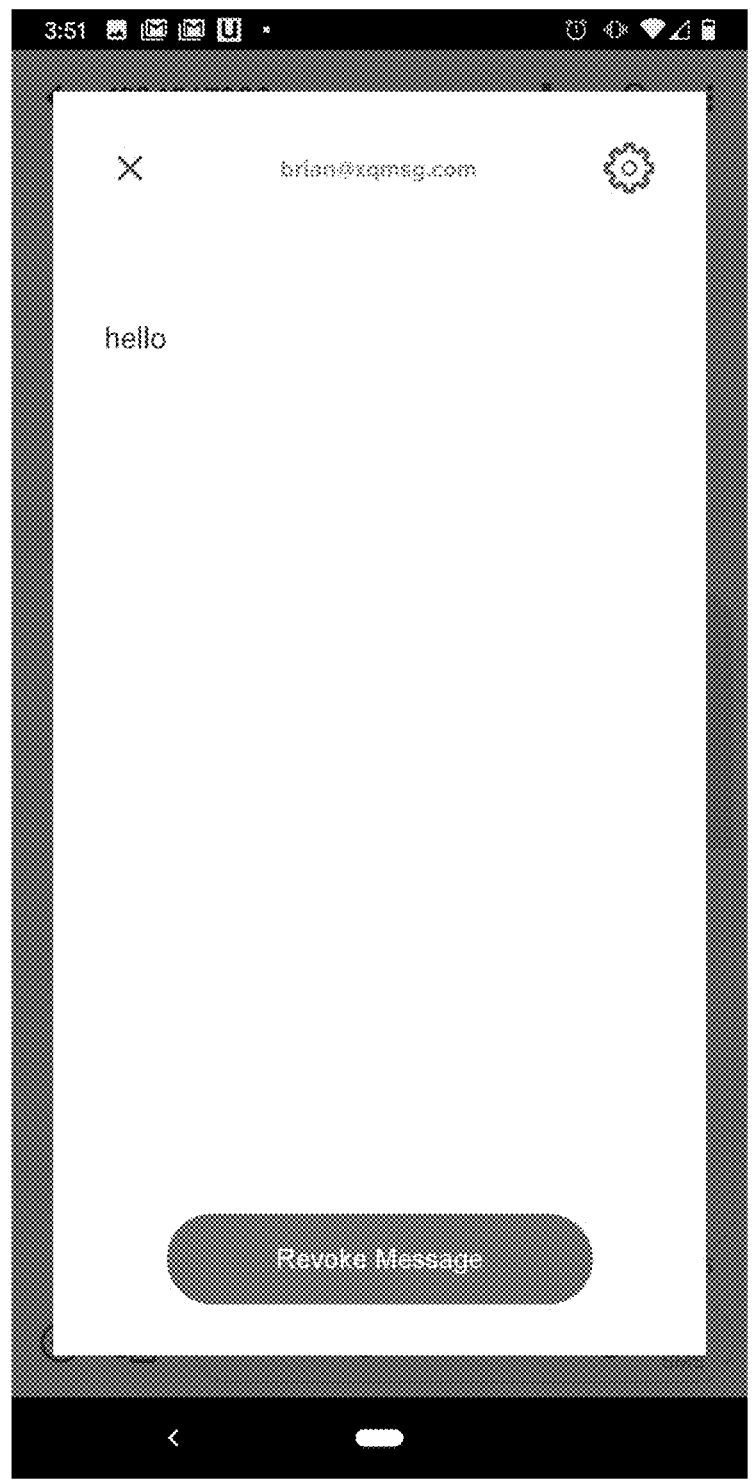
FIG. 34 shows an overlay decryption screen on a recipient device.

FIG. 34 shows an overlay decryption screen on a recipient device. Tapping on an encrypted link opens the keyboard app in overlay mode. Note that the user returns to whatever app they were in when they close the overlay.

Figure 35:
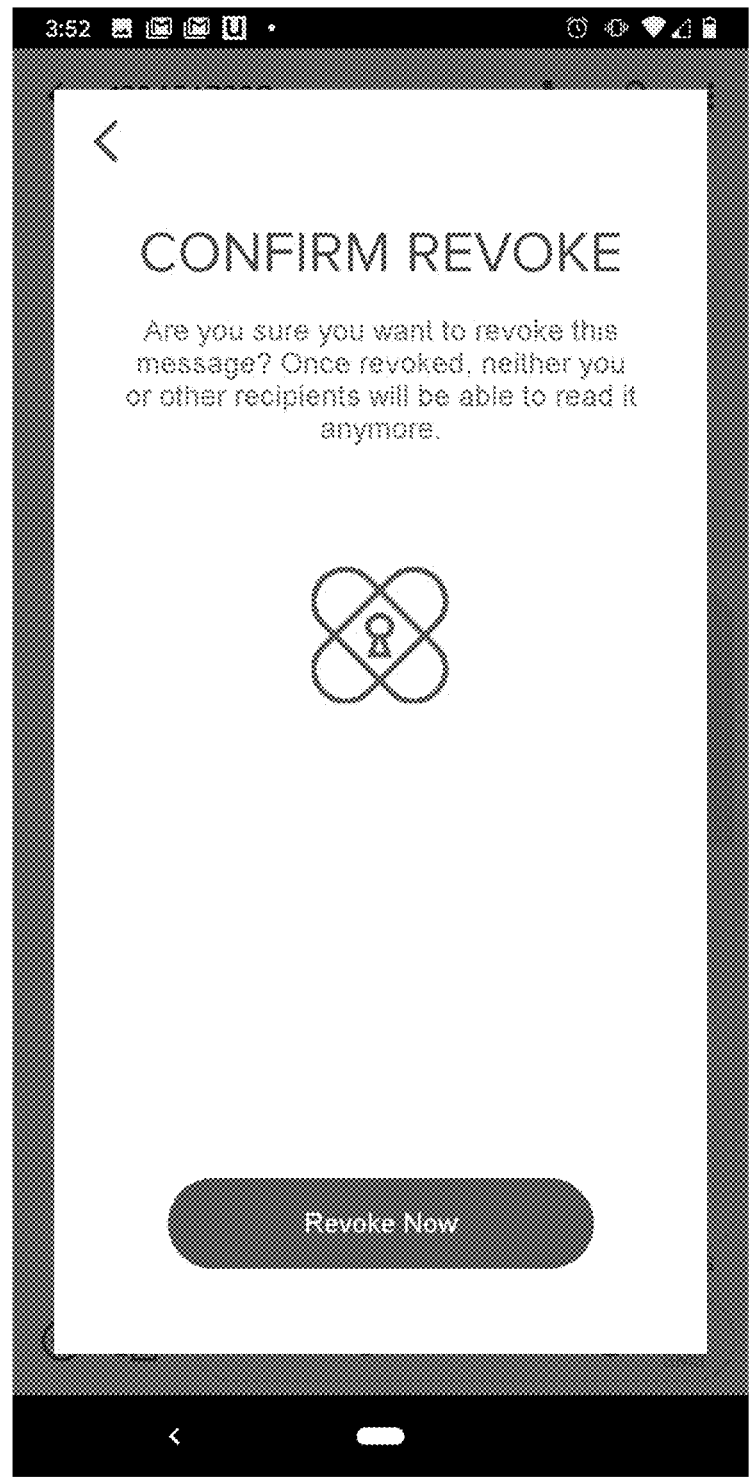
FIG. 35 shows a revoke screen on the recipient device.

FIG. 35 shows a revoke screen on the recipient device. In the previous overlay decryption screen (FIG. 34), the user can revoke the message. The user taps the revoke button, which brings up the revoke confirm dialog. The user can confirm the revocation. If confirmed, the message is revoked. Once a message is revoked it can no longer be decrypted by sender or recipient.

Figure 36:
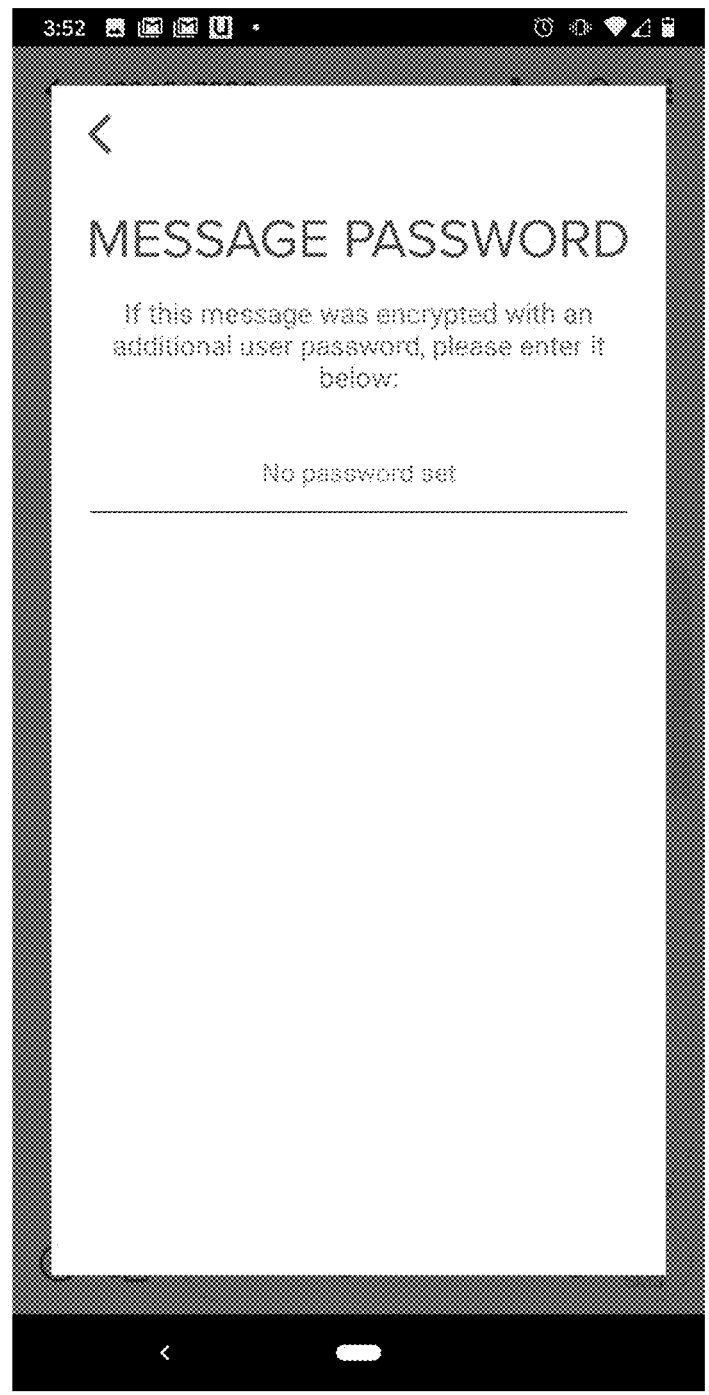
FIG. 36 shows a message password entry screen on the r recipient device.

FIG. 36 shows a message password entry screen on the r recipient device. The user can enter an additional user password for the message to be decrypted (when the sender additionally encrypted the message with an additional user password). By tapping on the settings icon the user is brought to the message password dialog. If the sender added an additional private password, it can be entered by the receiver here to decrypt.

Comparing Android and Apple apps, an Apple application is somewhat different than Android. Apple does not allow keyboard apps in the same way as Android. For Apple, (i) XQ is in iMessage as a native app (using the regular Apple keyboard). XQ has an Apple mobile app that enables users to generate an encrypted URL which they can paste into an app.

In an implementation, a method includes: installing a keyboard application on a first device; invoking a first application on the first device; within the first application, invoking the keyboard application; receiving a message input by the user in an input screen of the keyboard application within the first application, without exiting the first application; from the keyboard application, requesting a quantum random number for a quantum random number generator server; using the quantum random number received, within the keyboard application, generating an encryption key; using the keyboard application within the first application, sending a copy of the encryption key to an encryption key server and receiving a transaction receipt identifier from the encryption key server; using the keyboard application within the first application, encrypting the message using the encryption key and inserting the encrypted message in an input section of the first application in a form of a uniform resource locator (URL) link; and using the keyboard application within the first application, adding the transaction receipt identifier in unencrypted form to the body section of a new message screen of the first application. The encrypted message and the transaction receipt identifier in the input section of a new message screen will be transmitted by the first application.

In various implementations, the method includes: installing the keyboard application on a second device; invoking a second application on the second device; receiving the encrypted message at the second application on the second device; invoking the keyboard application within the second application; upon receiving a decryption request, at the keyboard application, sending the transaction receipt identifier to the encryption key server and receiving the corresponding encryption key used to the encrypt the encrypted message; and using the keyboard application within the second application, decrypting the encrypted message using the encryption key.

After installing the keyboard application, the user can select to replace the default keyboard of the first device with the installed keyboard application, such as replacing the default Android keyboard with XQ Keyboard. After installing the keyboard application, the user can select to use the installed keyboard application instead of a previously installed keyboard.

The method can include after passage of specific period of time, automatically removing the copy of the encryption key stored at the encryption key server. The method can include: after the encrypted message has been transmitted by the first application, and before the encrypted message has been decrypted at the second device, receiving a request at the encryption key server to revoke the sent encrypted message; and in response to the revoke request, deleting the copy of the encryption key. The encryption helper agent within the second application will be unable to decrypt the encrypted message without the availability of the copy of the encryption key.

The method can include: after the encrypted message has been transmitted by the first application, receiving a request at the encryption key server to delete the sent encrypted message; and in response to the delete request, deleting the copy of the encryption key. The encryption helper agent within the second application will be unable to decrypt the encrypted message without the availability of the copy of the encryption key.

The encrypted message is transmitted by the first application via a simple mail transfer protocol (SMTP) protocol, or other protocol such as Short Message Service (SMS), Multimedia Messaging Service (MMS), Extensible Messaging and Presence Protocol (XMPP), Rich Communication Services (RCS), Internet Relay Chat (IRC). The keyboard application allows the user to encrypt the message before encryption using quantum random number received using a password. The encrypted message is not stored at a server maintained by a service provider of the keyboard application.

In an implementation, a method includes: installing an keyboard application on a first mobile device; invoking a first messaging application on the first mobile device; within the first messaging application, invoking the keyboard application to input keyboard information; upon receiving an encryption request, via the keyboard application, requesting quantum random number for a quantum random number generator server; using the quantum random number received, within the first messaging application, generating an encryption key; using the encryption helper application within the first messaging application, sending a copy of the encryption key and receiving a transaction receipt identifier from the encryption key server; receiving a message input by the user in the keyboard application within the messaging application, without exiting the first messaging application; using the keyboard application within the first messaging application, encrypting the message using the encryption key; and using the keyboard application, inputting the encrypted message along the transaction receipt identifier to the first messaging application for transmission by the first messaging application.

In various implementation, the method includes: installing the keyboard application on a second mobile device; receiving the encrypted message at a second messaging application on the second mobile device; determining that encrypted message is encrypted and invoking the keyboard application within the second messaging application; upon receiving a decryption request, at the keyboard application, sending the transaction receipt to the encryption key server and receiving the corresponding encryption key used to the encrypt the encrypted message; and using the encryption helper application within the second messaging application, decrypting the message using the encryption key.

The method can include after passage of specific period of time, automatically removing the copy of the encryption key stored at the encryption key server. The method can include: after the encrypted message has been transmitted by the first messaging application, and before the encrypted message has been decrypted at the second mobile device, receiving a request at the encryption key server to revoke the sent encrypted message; and in response to the revoke request, deleting the copy of the encryption key. The keyboard application within the second messaging application will be unable to decrypt the encrypted message without the availability of the copy of the encryption key.

The method can include: after the encrypted message has been transmitted by the first messaging application, receiving a request at the encryption key server to delete the sent encrypted message; and in response to the delete request, deleting the copy of the encryption key. The keyboard application within the second messaging application will be unable to decrypt the encrypted message without the availability of the copy of the encryption key.

The first messaging application can be an e-mail application or messaging application. The encrypted message can be transmitted by the first messaging application via a short message service (SMS) protocol. The encrypted message is not stored at a server maintained by a service provider of the encryption helper application. The message, in unencrypted form, is not stored at a server maintained by a service provider of the first messaging application. A first service provider of the encryption helper application is different from a second service provider of the first messaging application.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A method comprising:
installing a keyboard application on a first device;
invoking a first application on the first device;
within the first application, invoking the keyboard application;
receiving a message input by the user in an input screen of the keyboard application within the first application, without exiting the first application;
from the keyboard application, requesting a quantum random number for a quantum random number generator server;
using the quantum random number received, within the keyboard application, generating an encryption key;
using the keyboard application within the first application, sending a copy of the encryption key to an encryption key server and receiving a transaction receipt identifier from the encryption key server;
using the keyboard application within the first application, encrypting the message using the encryption key and inserting the encrypted message in an input section of the first application in a form of a uniform resource locator (URL) link; and
using the keyboard application within the first application, adding the transaction receipt identifier in unencrypted form to the body section of a new message screen of the first application,
wherein the encrypted message and the transaction receipt identifier in the input section of a new message screen will be transmitted by the first application;
after the encrypted message has been transmitted by the first application, and before the encrypted message has been decrypted at a second device, receiving a request at the encryption key server to revoke the sent encrypted message; and
in response to the revoke request, deleting the copy of the encryption key, whereby a keyboard agent within a second application will be unable to decrypt the encrypted message without the availability of the copy of the encryption key.

2. The method of claim 1 comprising:
installing the keyboard application on the second device;
invoking the second application on the second device;
receiving the encrypted message at the second application on the second device;
invoking the keyboard agent within the second application;
upon receiving a decryption request, via the keyboard application, sending the transaction receipt identifier to the encryption key server and receiving the corresponding encryption key used to encrypt the encrypted message; and
using the keyboard agent within the second application, decrypting the encrypted message using the encryption key.

3. The method of claim 1 wherein after installing the keyboard application, the user selects to replace the default keyboard of the first device with the installed keyboard application.

4. The method of claim 1 wherein after installing the keyboard application, the user selects to use the installed keyboard application instead of a previously installed keyboard.

5. The method of claim 1 comprising:
after passage of a specific period of time, automatically removing the copy of the encryption key stored at the encryption key server.

6. The method of claim 1 wherein the encrypted message is transmitted by the first application via a simple mail transfer protocol (SMTP) protocol.

7. The method of claim 1 wherein the keyboard application allows the user to encrypt the message before encryption using a quantum random number received using a password.

8. A method comprising:
installing a keyboard application on a first device;
invoking a first application on the first device;
within the first application, invoking the keyboard application;
receiving a message input by the user in an input screen of the keyboard application within the first application, without exiting the first application;
from the keyboard application, requesting a quantum random number for a quantum random number generator server;
using the quantum random number received, within the keyboard application, generating an encryption key;

using the keyboard application within the first application, sending a copy of the encryption key to an encryption key server and receiving a transaction receipt identifier from the encryption key server;

using the keyboard application within the first application, encrypting a message using the encryption key and inserting the encrypted message in an input section of the first application in a form of a uniform resource locator (URL) link; and using the keyboard application within the first application, adding a transaction receipt identifier in unencrypted form to the body section of a new message screen of the first application, wherein the encrypted message and the transaction receipt identifier in the input section of a new message screen will be transmitted by the first application;

after the encrypted message has been transmitted by the first application, receiving a request at the encryption key server to delete the sent encrypted message; and in response to the delete request, deleting the copy of the encryption key, whereby a keyboard agent within a second application will be unable to decrypt the encrypted message without the availability of the copy of the encryption key.

9. The method of claim 1 wherein the encrypted message is not stored at a server maintained by a service provider of the keyboard application.

10. The method of claim 8 comprising:
installing the keyboard application on a second device;
invoking a second application on the second device;
receiving the encrypted message at the second application on the second device;
invoking the keyboard application within the second application;
upon receiving a decryption request, at the keyboard application, sending the transaction receipt identifier to the encryption key server and receiving the corresponding encryption key used to encrypt the encrypted message; and
using the keyboard application within the second application, decrypting the encrypted message using the encryption key.

11. The method of claim 8 wherein after installing the keyboard application, the user selects to replace the default keyboard of the first device with the installed keyboard application.

12. The method of claim 8 wherein after installing the keyboard application, the user selects to use the installed keyboard application instead of a previously installed keyboard.

13. The method of claim 8 comprising:
after passage of specific period of time, automatically removing the copy of the encryption key stored at the encryption key server.

14. The method of claim 8 wherein the encrypted message is transmitted by the first application via a simple mail transfer protocol (SMTP) protocol.

15. The method of claim 8 wherein the keyboard application allows the user to encrypt the message before encryption using a quantum random number received using a password.

16. The method of claim 8 wherein the encrypted message is not stored at a server maintained by a service provider of the keyboard application.

17. A method comprising:
installing an keyboard application on a first mobile device;
invoking a first messaging application on the first mobile device;
within the first messaging application, invoking the keyboard application to input keyboard information;
upon receiving an encryption request, via the keyboard application, requesting a quantum random number for a quantum random number generator server;
using the quantum random number received, within the first messaging application, generating an encryption key;
using the keyboard application within the first messaging application, sending a copy of the encryption key and receiving a transaction receipt identifier from the encryption key server;
receiving a message input by the user in the keyboard application within the messaging application, without exiting the first messaging application;
using the keyboard application within the first messaging application, encrypting the message using the encryption key; and
using the keyboard application, inputting the encrypted message and the transaction receipt identifier to the first messaging application for transmission by the first messaging application;
after the encrypted message has been transmitted by the first messaging application, and before the encrypted message has been decrypted at a second mobile device, receiving a request at the encryption key server to revoke the sent encrypted message; and
in response to the revoke request, deleting the copy of the encryption key, whereby the keyboard application within a second messaging application will be unable to decrypt the encrypted message without the availability of the copy of the encryption key.

18. The method of claim 17 wherein the first messaging application comprises an e-mail application.

19. The method of claim 17 wherein the encrypted message is transmitted by the first messaging application via a short message service (SMS) protocol.

20. The method of claim 17 wherein the encrypted message is not stored at a server maintained by a service provider of the keyboard application.

21. The method of claim 17 wherein the message, in unencrypted form, is not stored at a server maintained by a service provider of the first messaging application.

22. The method of claim 17 wherein a first service provider of the keyboard application is different from a second service provider of the first messaging application.

23. The method of claim 17 comprising:
installing the keyboard application on a second mobile device;
receiving the encrypted message at a second messaging application on the second mobile device;
determining that the encrypted message is encrypted and invoking the keyboard application within the second messaging application;
upon receiving a decryption request, at the keyboard application, sending the transaction receipt identifier to the encryption key server and receiving the corresponding encryption key used to the encrypt the encrypted message; and
using the keyboard application within the second messaging application, decrypting the message using the encryption key.

24. The method of claim 17 comprising:
after passage of a specific period of time, automatically removing the copy of the encryption key stored at the encryption key server.

25. The method of claim 11 comprising:
A method comprising:
installing an keyboard application on a first mobile device;
invoking a first messaging application on the first mobile device;
within the first messaging application, invoking the keyboard application to input keyboard information;
upon receiving an encryption request, via the keyboard application, requesting a quantum random number for a quantum random number generator server;
using the quantum random number received, within the first messaging application, generating an encryption key;
using the keyboard application within the first messaging application, sending a copy of the encryption key and receiving a transaction receipt identifier from an encryption key server;
receiving a message input by a user in the keyboard application within a messaging application, without exiting the first messaging application;
using the keyboard application within the first messaging application, encrypting the message using the encryption key; and
using the keyboard application, inputting the encrypted message and the transaction receipt identifier to the first messaging application for transmission by the first messaging application;
after the encrypted message has been transmitted by the first messaging application, receiving a request at the encryption key server to delete the sent encrypted message; and
in response to the delete request, deleting the copy of the encryption key, whereby the keyboard application within a second messaging application will be unable to decrypt the encrypted message without the availability of the copy of the encryption key.

26. The method of claim 25 comprising:
installing the keyboard application on a second mobile device;
receiving the encrypted message at a second messaging application on the second mobile device;
determining that the encrypted message is encrypted and invoking the keyboard application within the second messaging application;
upon receiving a decryption request, at the keyboard application, sending the transaction receipt identifier to the encryption key server and receiving the corresponding encryption key used to encrypt the encrypted message; and
using the keyboard application within the second messaging application, decrypting the message using the encryption key.

27. The method of claim 25 comprising:
after passage of a specific period of time, automatically removing the copy of the encryption key stored at the encryption key server.

28. The method of claim 25 wherein the first messaging application comprises an e-mail application.

29. The method of claim 25 wherein the encrypted message is transmitted by the first messaging application via a short message service (SMS) protocol.

30. The method of claim 25 wherein the encrypted message is not stored at a server maintained by a service provider of the keyboard application.

31. The method of claim 25 wherein the message, in unencrypted form, is not stored at a server maintained by a service provider of the first messaging application.

32. The method of claim 25 wherein a first service provider of the keyboard application is different from a second service provider of the first messaging application.

* * * * *